(12) United States Patent
Song et al.

(10) Patent No.: US 9,886,693 B2
(45) Date of Patent: Feb. 6, 2018

(54) PRIVACY PROTECTED ANTI IDENTITY THEFT AND PAYMENT NETWORK

(76) Inventors: Yuh-shen Song, Northridge, CA (US); Catherine Lew, Northridge, CA (US); Alexander Song, Northridge, CA (US); Victoria Song, Northridge, CA (US)

( * ) Notice: Subject to any disclaimer, the term of this patent is extended or adjusted under 35 U.S.C. 154(b) by 830 days.

(21) Appl. No.: 12/638,886

(22) Filed: Dec. 15, 2009

(65) Prior Publication Data

US 2010/0250364 A1 Sep. 30, 2010

Related U.S. Application Data

(60) Provisional application No. 61/211,335, filed on Mar. 30, 2009.

(51) Int. Cl.
| | | |
|---|---|---|
| G06Q 20/40 | (2012.01) | |
| G06Q 20/02 | (2012.01) | |
| G06Q 20/38 | (2012.01) | |
| G06F 21/33 | (2013.01) | |
| G06Q 20/10 | (2012.01) | |
| G06Q 30/02 | (2012.01) | |
| G06Q 50/26 | (2012.01) | |
| G06Q 40/00 | (2012.01) | |
| H04L 29/06 | (2006.01) | |

(52) U.S. Cl.
CPC ........... *G06Q 20/405* (2013.01); *G06F 21/33* (2013.01); *G06Q 20/02* (2013.01); *G06Q 20/10* (2013.01); *G06Q 20/108* (2013.01); *G06Q 20/38* (2013.01); *G06Q 20/382* (2013.01); *G06Q 20/385* (2013.01); *G06Q 20/3821* (2013.01); *G06Q 20/40* (2013.01); *G06Q 20/401* (2013.01); *G06Q 20/4012* (2013.01); *G06Q 20/4014* (2013.01); *G06Q 20/4016* (2013.01); *G06Q 30/0248* (2013.01); *G06Q 40/12* (2013.12); *G06Q 50/265* (2013.01); *H04L 63/101* (2013.01); *H04L 63/102* (2013.01)

(58) Field of Classification Search
USPC .............................................. 705/64; 726/26
See application file for complete search history.

(56) References Cited

U.S. PATENT DOCUMENTS

| | | | |
|---|---|---|---|
| 6,286,756 B1 | 9/2001 | Stinson et al. | |
| 6,779,721 B2 * | 8/2004 | Larson | G06Q 10/063 235/380 |

(Continued)

FOREIGN PATENT DOCUMENTS

| | | |
|---|---|---|
| CN | 1567320 A | 1/2005 |
| CN | 1835008 A | 9/2006 |

(Continued)

*Primary Examiner* — Nicholas D Rosen
(74) *Attorney, Agent, or Firm* — Seyfarth Shaw LLP

(57) ABSTRACT

A computerized and networked system protects individuals against identity theft without the need to disclose the detailed personal information of the individuals. Furthermore, the system helps prevent loss and damage to consumers, financial institutions and merchants caused by financial crimes related to identity theft. In addition, users can conduct payments in a secure manner without the need to use any traditional financial instrument. A pass code can be generated for each transaction and sent to a user's personal communications device. When the correct pass code is received from the user, the transaction is then authorized.

5 Claims, 11 Drawing Sheets

(56) References Cited

U.S. PATENT DOCUMENTS

| | | | |
|---|---|---|---|
| 7,197,640 B2 | 3/2007 | Meisel | |
| 7,686,214 B1* | 3/2010 | Shao et al. | 235/380 |
| 7,774,270 B1* | 8/2010 | MacCloskey | 705/38 |
| 8,176,025 B2* | 5/2012 | Ota | G06F 17/30244 |
| | | | 707/602 |
| 8,302,858 B2* | 11/2012 | Eng | G06K 19/005 |
| | | | 235/380 |
| 8,625,838 B2* | 1/2014 | Song | G06F 21/33 |
| | | | 235/380 |
| 9,390,417 B2* | 7/2016 | Song | G06F 21/33 |
| 2001/0007132 A1* | 7/2001 | Regev | G06F 21/606 |
| | | | 726/7 |
| 2002/0099649 A1* | 7/2002 | Lee et al. | 705/38 |
| 2003/0061167 A1 | 3/2003 | Mann et al. | |
| 2003/0115459 A1* | 6/2003 | Monk | G06Q 50/26 |
| | | | 713/168 |
| 2003/0158785 A1 | 8/2003 | Erca | |
| 2003/0217012 A1* | 11/2003 | Rothfarb | G06F 21/10 |
| | | | 705/64 |
| 2004/0056089 A1* | 3/2004 | Larson | G06Q 10/063 |
| | | | 235/382 |
| 2005/0033684 A1* | 2/2005 | Benedyk | G06Q 20/04 |
| | | | 705/39 |
| 2005/0086164 A1 | 4/2005 | Kim et al. | |
| 2005/0243984 A1 | 11/2005 | Mahone et al. | |
| 2006/0000021 A1* | 1/2006 | Hayes et al. | 5/618 |
| 2006/0080545 A1 | 4/2006 | Bagley | |
| 2006/0161435 A1* | 7/2006 | Atef | G06F 21/31 |
| | | | 704/246 |
| 2007/0043577 A1* | 2/2007 | Kasower | 705/1 |
| 2007/0063017 A1* | 3/2007 | Chen | G06Q 20/02 |
| | | | 235/379 |
| 2007/0083463 A1 | 4/2007 | Kraft | |
| 2007/0083771 A1 | 4/2007 | Chen | |
| 2007/0136573 A1* | 6/2007 | Steinberg | G06F 21/32 |
| | | | 713/155 |
| 2007/0250920 A1* | 10/2007 | Lindsay | 726/7 |
| 2008/0013800 A1* | 1/2008 | Steinberg et al. | 382/118 |
| 2008/0040285 A1 | 2/2008 | Wankmuller | |
| 2008/0059366 A1* | 3/2008 | Fou | G06Q 20/10 |
| | | | 705/39 |
| 2008/0103800 A1* | 5/2008 | Domenikos et al. | 705/1 |
| 2009/0234882 A1* | 9/2009 | Ota | G06F 17/30265 |
| 2010/0017413 A1* | 1/2010 | James | 707/10 |
| 2010/0243741 A1* | 9/2010 | Eng | G06K 19/005 |
| | | | 235/487 |
| 2011/0225045 A1* | 9/2011 | Song | G06F 21/33 |
| | | | 705/14.53 |
| 2016/0292683 A1* | 10/2016 | Song | G06F 21/33 |

FOREIGN PATENT DOCUMENTS

| | | | | |
|---|---|---|---|---|
| CN | 101017583 A | 8/2007 | | |
| JP | 2006313474 A1 | 11/2006 | | |
| KR | 20-2000-002814 | 2/2000 | | |
| KR | 10-2002-0088023 A | 11/2002 | | |
| KR | 1020030014871 A1 | 2/2003 | | |
| KR | 1020020065989 A1 | 3/2003 | | |
| KR | 10-2005-0009336 A | 1/2005 | | |
| WO | WO 2006000021 A1 * | 1/2006 | | G06F 17/60 |

* cited by examiner

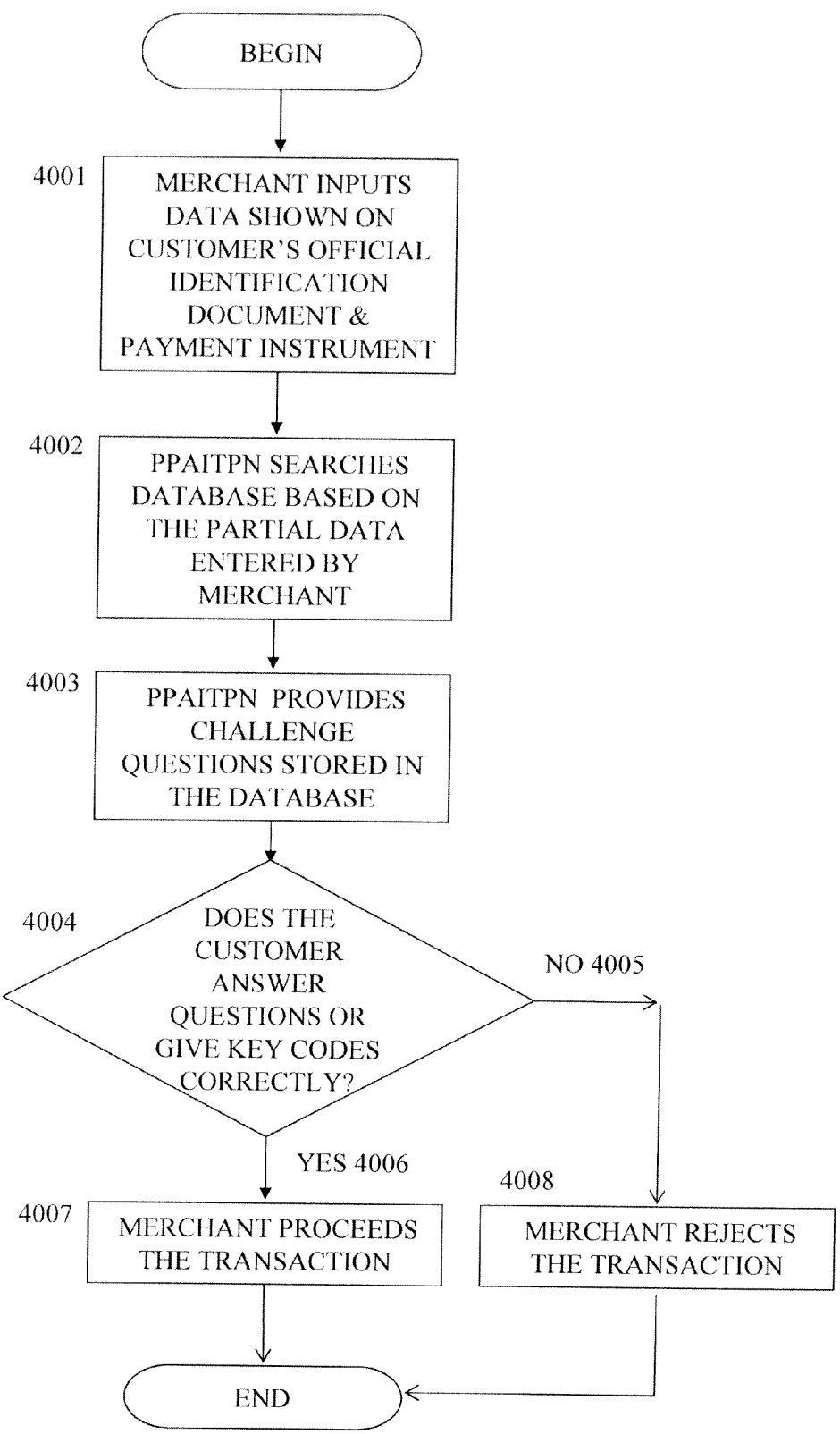

PRIVACY PROTECTED ANTI IDENTITY THEFT AND PAYMENT NETWORK

CROSS REFERENCE TO RELATED APPLICATION

This application claims the benefit of U.S. Provisional Application No. 61/211,335, filed on Mar. 30, 2009, the disclosure of which is expressly incorporated by reference herein in its entirety.

TECHNICAL FIELD

The present disclosure relates generally to computer networking systems. More specifically, the present disclosure relates to using networked computer systems to reduce or prevent financial crimes involving identity theft.

BACKGROUND

Identity theft and its related crimes have recently become prevalent. Many individuals, merchants and financial institutions have already suffered tremendous material loss and damages as a result of these financial crimes.

If a perpetrator can steal another person's identity, he/she can easily commit many kinds of financial crimes based on the stolen identity. Therefore, protecting the identity of a person is crucial to preventing many types of financial crimes.

Some vendors offer identity theft protection for individuals. However, these vendors can only prevent a limited scope of identity theft. For example, some vendors may charge an individual a fee to post a "fraud alert" on behalf of the individual with all major credit report companies such as Equifax, TransUnion, Experian, etc. According to the Fair Credit Reporting Act, 15 U.S.C. §1681c-1, a user of a credit report, e.g. a credit card company, must contact the consumer if a credit application is received on behalf of the consumer and there is a fraud alert in the credit report of the consumer. In fact, consumers can post "fraud alerts" with credit report companies by themselves.

When a perpetrator ("fraudster") uses the identity of a consumer, who has posted a "fraud alert," to open a credit card account, the credit card company may order a credit report to review the credit history of the consumer. As a result of the Fair Credit Reporting Act, the consumer will be contacted by the credit card company during the account opening process because there is a fraud alert in the credit report of the consumer. Consequently, a perpetrator will not be able to open this account after the credit card company contacts the consumer and determines that the consumer did not apply for the credit card account.

This kind of protection has a very limited scope, however. It can only work if the financial institution, such as the credit card company, happens to use the credit report which has a fraud alert. In reality, many identity theft cases do not involve opening a new account with another person's identity.

Moreover, in order to post a "fraud alert" on behalf of a consumer, a vendor has to collect detailed personal information of the consumer because the credit report companies have to verify the identity of the consumer before allowing him/her to post the fraud alert. Naturally, a consumer may be exposed to even greater identity theft risk because the consumer has to disclose his/her detailed personal information to the vendor, a third party, which may have employees engaged in fraud (i.e., fraudsters). Sharing personal information with third parties actually carries the risk of increased identity theft and fraud.

In addition to the examples given above, identity theft can be easily committed in the computer age because a user is often identified by a user ID and/or Personal Identification Number ("PIN") and a password. Once a fraudster has stolen the user ID and/or PIN and password of another person, that fraudster can conduct many criminal activities through access to this account. Therefore, identity theft is a major threat to online banking, online trading, e-commerce, and many other computer related activities.

Furthermore, identity theft is often involved in payment fraud. The traditional payment instruments such as checks, credit cards, debit cards, ATM cards, etc. can be easily stolen or fabricated. Once a fraudster has stolen or fabricated such instruments of another person, the fraudster can quickly conduct many illegal payment transactions before the affected financial institutions identify the fraud and freeze the payments.

Fraudsters can commit identity theft in many ways. One objective may be to steal somebody's personal information to open a financial account. Given the fact that most financial institutions have a solid Customer Identification Program (CIP) in place as a result of the USA PATRIOT Act and FACT Act, opening a financial account with a counterfeit identity is now a difficult and risky approach to commit fraud.

An easier way to commit identity theft is to steal the information of a consumer's credit card, debit card, stored value card, etc. This can be done, for example, by bribing waiters and waitresses in restaurants to copy such information from the restaurants' guests. A fraudster can use the stolen card information to pay a nominal fee to numerous background search websites on the Internet to find useful personal information based on the consumer's name shown on the stolen card. A counterfeit card and a counterfeit identification document, such as a driver's license, can be easily fabricated with present technology. The fraudster can use the counterfeit card and the counterfeit identification document to engage, at least for several hours, in a shopping spree based on the consumer's stolen identity.

Financial institutions and merchants are losing billions of dollars every year because of this kind of identity theft. Additionally, identity theft victims must spend considerable amounts of personal time to clean up their credit records, replace cards with new account numbers, etc., after their identities are stolen.

In fact, stealing personal information can be easily committed today. Many financial institutions and merchants have kept the personal information including the information of credit cards, debit cards, etc. of their clients in their databases. It has become common for employees of financial institutions, merchants, or consumer report companies to steal customers' personal information, commit fraud, and/or sell the information to fraudsters.

In addition to credit cards, debit cards, etc., checks are still one of the most popular payment instruments today. It is easier to fabricate a counterfeit check than to fabricate a counterfeit card. There are numerous cases related to counterfeit checks which are used together with counterfeit identification documents.

Furthermore, an online merchant cannot easily tell whether a remote consumer has the correct identity. If correct credit card information, which can be obtained from a stolen credit card, and the correct billing address, which can be obtained from Internet search websites, are presented, the merchant cannot easily tell whether the remote consumer is actually a fraudster. An experienced fraudster can easily conduct identity theft through online transactions. As a result, online merchants lose a tremendous amount of money every year.

In addition, many commercial activities conducted on the Internet are based on user ID and/or PIN and password. Once the user ID and/or PIN and password of a person are stolen, there is no way to tell whether the person logging in remotely has the correct identity or not. User ID and/or PIN and password can be stolen through many ways. For example, a fraudster can obtain the User ID and/or PIN and password of a person by remotely watching or recording the finger movement of the person when he/she logs into a computer system. Phishing is another common scheme used by fraudsters to solicit personal information directly from a customer by falsely representing a financial institution or a merchant.

In summary, identity theft and its related crimes can be easily committed today and individuals, merchants and financial institutions are suffering enormous losses and damages. There is no fully reliable solution available to prevent identity theft and payment fraud. If a fraudster can steal another person's identity, he/she can easily commit all kinds of financial crimes based on this stolen identity.

SUMMARY

The present disclosure describes a networked computer system to prevent identity theft, fraud, and other related financial crimes. In addition, the present disclosure enables consumers to conduct payments in an anti-fraud manner without the need to use any traditional financial instrument which can be easily stolen or fabricated.

In addition, as a result of the present disclosure, there is no need for consumers to carry traditional payment instrument such as cash, checks, credit cards, debit cards, pre-paid cards, gift cards, stored-value cards, ATM cards, monetary instruments, etc.

In accordance with the present disclosure, the personal information of a consumer is stored in a database in a networked computer system. When a presumed consumer tries to conduct a transaction with individuals, financial institutions or merchants based on the stolen identity of the consumer, personal information of the consumer, such as a photo, challenge question, etc. can be provided to the individuals, financial institutions or the merchants through the network. The individuals, financial institutions and merchants can then verify whether the presumed consumer (e.g., a subject person) corresponds to the personal information of the true consumer provided by the computer system and thus reject the transaction if the result is negative, i.e., if the subject person is a potential fraudster.

The computer system can help individuals, merchants and financial institutions accurately and quickly identify a consumer. Furthermore, the present disclosure can also suppress or prevent identity theft in a remote and/or online transaction and similar computer-related applications.

To implement the above system of secure transactions, several obstacles must be overcome. First, the personal information of a consumer is highly confidential. Most consumers are reluctant to provide their personal information to a computer system for other individuals, financial institutions or merchants to use.

Even if consumers are willing to provide their personal information for other individuals, financial institutions or merchants to use, the individuals and people working for financial institutions or merchants can also be fraudsters or accomplices of fraudsters, as such information is available to be stolen.

If the detailed personal information is not available, it is also not possible for a third party, such as an agent, to post a fraud alert with any credit report company on behalf of a consumer.

In addition, individuals, financial institutions and merchants may not be able to verify the personal information with a remote person during an online and/or remote transaction even if the personal information is available.

Furthermore, some minors may not have an identification document, such as a driver's license, passport, etc. Additionally, some parents may not feel comfortable letting minors carry large sums of cash, pre-paid cards, gift cards, etc. during shopping. Alternatively, while shopping or on a trip, a consumer may forget to bring his/her wallet or may have lost the wallet, which contains the payment instruments and identification documents. Therefore, there is a need for enabling consumers to conduct payment transactions without using any traditional financial instrument or identification document, while still guaranteeing security against identity theft and fraudulent use.

In the present disclosure, a computer system to prevent identity theft, has a computer processor and a memory device coupled to a network; a database stored on the memory device adapted to store at least a first set of data derived from a consumer's personal information in a manner in which the consumer's personal information cannot be recovered from the first set of data. The database is further adapted to store, associated with the first set of data, a photo of a consumer and/or a challenge question and its answer created by the consumer. The computer system also includes a communications device transmitting in response to instructions from the processor the photo and/or the challenge question to a user via the network when the processor receives from the user a second set of data from the network. The second set of data corresponds to the first set of data and is associated with a subject.

Furthermore, a computer system to prevent identity fraud has a computer processor and a memory device coupled to a network; and a database stored on the memory device. The database is adapted to store at least one set of user identification information. A code generator is operable on the computer processor to create a new pass code. The new pass code cannot be known before its creation and shall expire after a period of time. The new pass code is generated, in response to each receipt of the set of user identification information from a device interface. The computer system also includes a first communications device transmitting the pass code to the user, and a second communications device transmitting an authorization to the device interface when the pass code is subsequently received from the device interface before the pass code expires.

In an alternative embodiment of the present disclosure, upon receiving the pass code from the computer system, the user transmits via a communications device a confirmation to the computer system. A communications device transmits an authorization in response to receiving the confirmation from the user.

In addition, a computer system to prevent consumer identity fraud has a processor and a memory device coupled to a network. The processor receives over the network from a consumer contact information, an expiration date of a fraud alert, and a desired early warning period to renew the fraud alert. The processor transmits to the consumer on the occurrence of the desired early warning period a reminder to post a new fraud alert with at least one credit report company. The computer processor receives from the consumer a new expiration date for the new fraud alert.

Alternatively, a computer system to prevent consumer identity fraud has a processor and a memory device coupled to a network. The processor receives over the network from a consumer identification information recognized by at least one credit report company and a request to post a fraud alert. The processor requests the credit report company to post the fraud alert on behalf of the consumer based on the identification information. The processor requests the fraud alert to be repeatedly posted until a cancellation is received from the consumer.

As another alternative, a computer system to prevent consumer identity fraud has a processor and a memory device coupled to a network. The processor receives over the network from a consumer personal information and a request to post a fraud alert. The processor logs in at least one credit report company's device interface on behalf of the consumer and requests a fraud alert to be posted on behalf of the consumer. The processor repeats the request for posting a fraud alert until a cancellation is received from the consumer.

Moreover, a computer system to prevent identity theft has a computer processor and a memory device coupled to a network. A database stored on the memory device is adapted to store at least a first set of data and a second set of data provided by a consumer. The first set of data and the second set of data are personal information associated with the consumer. The computer system also has a first communications device transmitting in response to instructions from the processor the second set of data to a device interface via the network when the processor receives from the device interface a third set of data from the network. The third set of data corresponds to the first set of data and is associated with a subject. The computer system includes a second communications device receiving confirmation from the device interface indicating whether the second set of data is accurate based on the information associated the subject. The processor determines a degree of accuracy of the personal information provided by the consumer based on confirmations received from multiple device interfaces.

This disclosure also presents a computerized method to prevent identity theft. A computer system receives identification information from a presumed consumer and stores the identification information in a database. The computer system also receives a personal phone number from the presumed consumer and stores the personal phone number associated with the identification information of the presumed consumer in the database. The computer searches the database to find all historical identification information associated with the personal phone number of the presumed consumer; and indicates a potential identity theft by the presumed consumer when the identification information of the presumed consumer does not correspond to other historical identification information stored in the database and associated with the personal phone number of the presumed consumer.

In this disclosure, the terminology "network" or "networks" generally refers to one communication network or several communication networks, which can be wireless or wired, private or public, or a combination of them, and includes the well-known Internet.

In this disclosure, the terminology "computer" or "computer system" generally refers to either one computer or a group of computers, which may work alone or work together to accomplish the purposes of the system.

In this disclosure, the terminology "processor" generally refers to either one processor or a group of processors, which may work alone or work together to accomplish the purposes of the computer system.

In this disclosure, a "bank" or "financial institution" generally refers to a financial service provider, either a bank or a non-bank, where financial services are provided.

In this disclosure, a "bank account" or "financial account" generally refers to an account in a financial institution such as banks, credit unions, stockbrokers, trading companies, securities companies, investment companies, insurance companies and agencies, finance companies, payment services companies, money services organizations, financial services providers, etc. where transactions can be conducted through payment instruments such as cash, checks, credit cards, debit cards, gift cards, pre-paid cards, stored value cards, ATM cards, wires, letters of credit, monetary instruments, electronic fund transfers, automatic clearing house, etc.

In this disclosure, a "consumer" generally refers to a customer, subject, person, payer, user, or client, etc., seeking to perform a transaction with an individual, merchant, and/or financial institution.

In this document, the terminology "official identification document" generally refers to a passport, a driver's license, a voter card, a benefits card, a national identification card, an identity card, a certificate of legal status, and other official documents and information bearing instruments that identify a designated individual by certain verifiable characteristics, that are issued or certified by a consulate, embassy, government agency, or other governmental authorities, and that are protected against unauthorized copying or alteration by the responsible government. In particular, such "official identification documents" can be formed from various materials, including paper, plastic, polycarbonate, PVC, ABS, PET, Teslin, composites, etc. and can embed the identification information in various formats, including printed or embossed on the document (or card), written on a magnetic medium, programmed into an electronic device, stored in a memory, and combinations thereof. The "identification information" may include, but is not necessarily limited to, names, identification numbers, date of birth, signatures, addresses, passwords, phone numbers, email addresses, personal identification numbers, tax identification numbers, national identification numbers, countries that issue the IDs, states that issue the IDs, ID expiration date, photographs, fingerprints, iris scans, physical descriptions, and other biometric information. The embedded information can be read through optical, acoustic, electronic, magnetic, electromagnetic and other media.

In this disclosure, a "device interface" generally refers to a keyboard, a keypad, a monitor, a display, a terminal, a computer, a control panel, a vehicle dash board, a network interface, a machinery interface, a video interface, an audio interface, an electrical interface, an electronic interface, a magnetic interface, an electromagnetic interface including electromagnetic wave interface, an optical interface, a light interface, an acoustic interface, a video interface, an audio interface, a contactless interface, a cellular phone interface, a Personal Digital Assistant (PDA) interface, a handheld device interface, a portable device interface, a wireless interface, a wired interface, and other interfaces that can communicate with a computer system.

In this document, the terminology "terminal" or "kiosk" generally refers to equipment, including a computer and/or its peripherals, microprocessor and/or its peripherals, ATM terminal, check-cashing kiosk, money services kiosk, merchant checkout stand, cash register, coin exchange machine, parking lot payment kiosk, other payment kiosks, contactless device, wire line phone, mobile phone, smartphone, PDA, digital assistant, entertainment device, network interface device, router, and/or Personal Digital Assistant (PDA), etc., which interfaces a user with a computer network, so that the user may interact with computer systems and other equipment connected to the computer network.

For a further understanding of the nature and advantages of the disclosure, reference should be made to the following description taken in conjunction with the accompanying drawings.

BRIEF DESCRIPTION OF THE FIGURES

FIG. 4 is a flow chart of an example process, indicating how the system shown in FIG. 1 protects online and/or remote merchants against identity theft and fraud.

DETAILED DESCRIPTION

Figure 1:
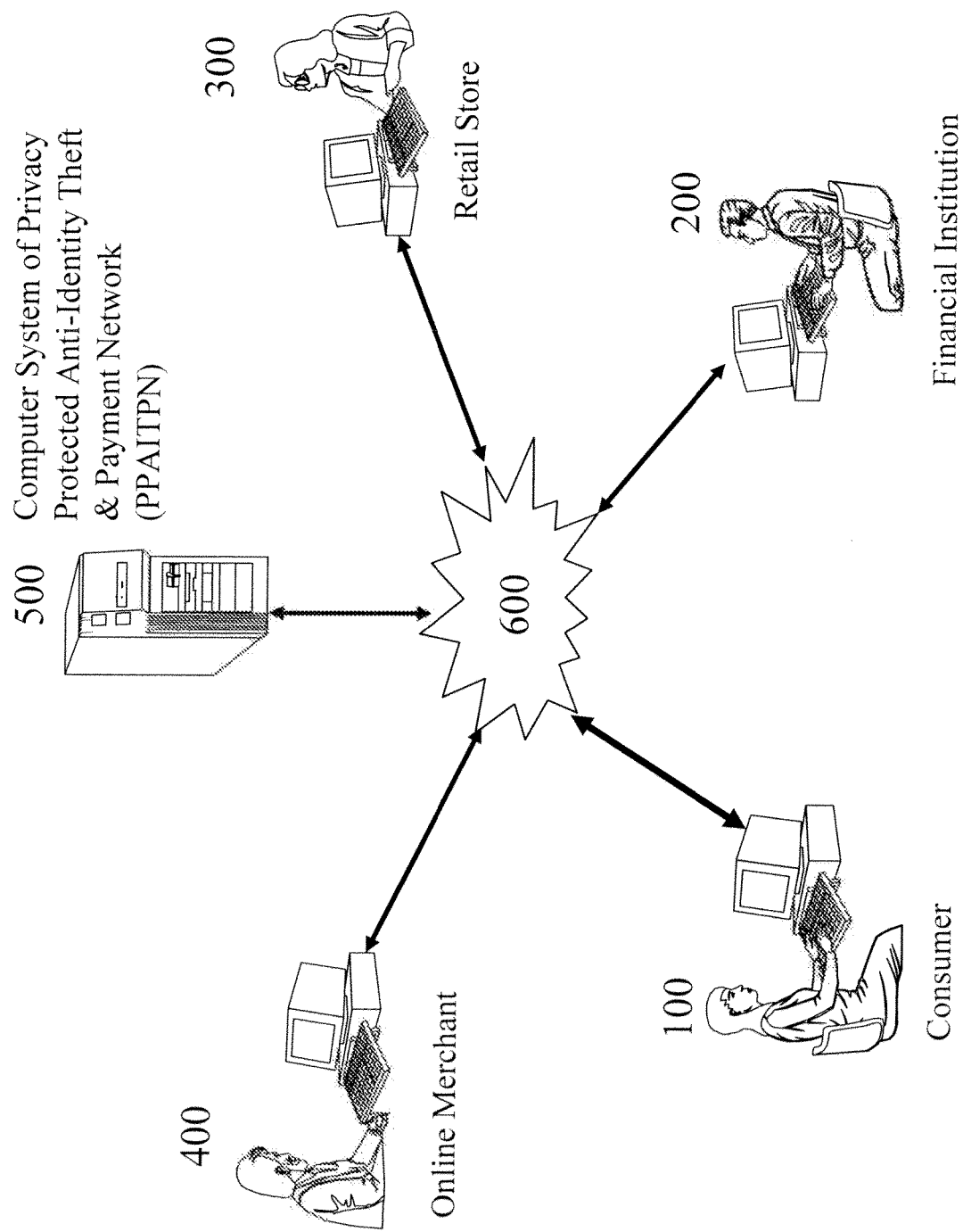
FIG. 1 illustrates a system and network diagram of a Privacy Protected Anti-Identity Theft and Payment Network ("PPAITPN") to enable consumers, financial institutions and merchants to jointly prevent identity theft, fraud and related financial crimes.

Most identity theft cases belong to a category referred to as "stealing identity randomly," in which the fraudster randomly steals the identity of a victim whom the fraudster may not even know. Under such circumstances, the fraudster usually tries to conduct as many financial transactions or purchases as possible based on the stolen identity very quickly before the fraud is discovered by the victim, vendors, and/or financial institutions.

"Stealing identity selectively" refers to identity theft cases where the fraudster may know the consumer. The fraudster is generally easier to trace in such cases, and therefore the incidence of such fraud is less frequent.

The present disclosure describes a system to prevent identity theft in both the "stealing identity randomly" and the "stealing identity selectively" categories. In addition, the present disclosure enables prevention of other financial crimes associated with identity theft.

In the present disclosure, a Privacy Protected Anti-Identity Theft and Payment Network ("PPAITPN") is established on a computer network such as the Internet, which may be accessed globally. The PPAITPN includes a computer system that records and stores the transactions in a database, manages the accounts in PPAITPN, and controls the network and transaction activities occurring on the PPAITPN.

In one embodiment of the present disclosure, a consumer logs into the PPAITPN computer system through a device interface and registers with the computer system of PPAITPN. However, to protect the consumer's information privacy, the PPAITPN computer system only collects a set of partial data of the personal information of the consumer through a device interface.

For the purpose of this disclosure, a consumer's personal information includes the identification information contained in, shown on, or associated with such instruments or identification documents. Exemplary personal information includes a name, address, date of birth, tax identification number, national identification number, personal identification number, type of the identification document or instrument, identification number associated with the identification document or the instrument, country, state, government organization and/or private organization issuing the identification document or the instrument, expiration date of the identification document or the instrument, phone number, fax number, e-mail address, signature, biometrical information, financial account information, utility account information, insurance account information, brokerage account information, and/or financial service provider information.

For the purpose of this disclosure, the word "document" and the word "card" are generally interchangeable.

A partial list of exemplary instruments or documents includes a driver's license, birth certificate, alien identification card, passport, official identification document, national identification document, benefits card, voter card, etc. and financial instrument such as a credit card, debit card, prepaid card, stored-value card, gift card, check card, ATM card, check, stock certificate, insurance ID card, brokerage ID card, police ID card, membership ID card, etc.

For example, the device interface of the PPAITPN computer system may only collect the zip code of the address shown on the consumer's identification document, the year of birth, the last four digits of the ID number, the first two letters of the first name shown on the ID, the first two letters of the last name shown on the ID, the country/state of issuance of the ID, the expiration date of the ID, etc.

Because only a set of partial data of the consumer's personal information is used, the consumer is not identifiable. Furthermore, there is no way to precisely identify the consumer from or through this set of partial data stored in the database.

Although only a set of partial data of the consumer's personal information is stored in the PPAITPN's database, the probability of a mismatch for two persons having the same set of partial data can be substantially reduced to zero if a sufficient amount of partial data is used. In the current example, the probability for a mismatch is in the magnitude of about 1 out of $10^{22}$. The number $10^{22}$ is derived from the approximation of $10^5$ (5 digit zip code)$\times 10^2$ (year of birth based on two digits of a 100-year life span)$\times 10^4$ (4 digits of ID number)$\times 26^2$ (2 letters of first name)$\times 26^2$ (2 letters of last name)$\times 200$ (estimated number of participating countries)$\times 365\times 4$ (a 4-year effective period for the ID).

Even if two consumers have the same set of partial data, such confusion can be easily resolved by other methods, such as reviewing additional information such as a photo, or contacting the consumers for clarification, or asking additional questions based on the consumer's additional partial data. Consequently, a user of the PPAITPN computer system can still uniquely identify an individual in the PPAITPN database although only a set of partial data of the individual's personal information identifies an individual.

Because only a set of partial data of an individual is stored inside the PPAITPN database, even if a hacker breaks into the computer system of the PPAITPN, there is no meaningful personal information stored there.

More importantly, because nobody can obtain useful information from the set of partial data, a consumer does not need to worry about whether a fraudster can steal his/her personal information by accessing the PPAITPN database.

In one embodiment of the present disclosure, the consumer uploads his/her recent photo into the computer system of PPAITPN. Because a person's face is exposed to the public everyday and many online social networks may have already posted the photo of the person on the Internet, the photo of a consumer is generally not considered to be "private information."

In another embodiment of the present disclosure, a consumer provides additional information, e.g., social security number and name, so that the PPAITPN can verify the accuracy of the partial personal information provided by the consumer through third parties such as government agencies, consumer credit report companies, etc.

In one embodiment of the present disclosure, in order to open an account, a consumer uploads his/her name and tax ID so the PPAITPN can verify the existence of the consumer through government records. Because each consumer has one unique tax ID, each consumer has only one chance to register with the computer system of PPAITPN. If a duplicate tax ID is detected, the PPAITPN can conduct an investigation to identify which consumer has the correct tax ID and can filter out the fraudster. The tax ID can be encrypted in the database, or encrypted in a separate database, so that nobody can see or use it after the account opening process.

To comply with anti-money laundering, anti-terrorist financing and anti-financial crimes requirements, in one embodiment of the present disclosure, the computer system screens the consumer against regulatory lists to ensure that the PPAITPN can conduct business with the consumer in compliance with applicable regulations and laws. In another embodiment of the present disclosure, the computer system of the PPAITPN conducts transactional monitoring to detect suspicious activities in compliance with applicable regulations and laws.

It is possible that a fraudster may attempt to open an account with the PPAITPN but provide the PPAITPN with another person's financial account information (i.e., stolen information). To prevent this kind of fraud, in yet another embodiment of the present disclosure, when a consumer provides information about a financial account in the consumer's name, the PPAITPN can conduct a transaction with the presumed consumer's financial account and request the consumer to report the amount and/or the type of transaction. If the consumer cannot report it correctly, the consumer may be a fraudster. To further protect the consumer, the financial account information can be encrypted so that nobody can see or use it.

To ensure that the partial data stored in the PPAITPN database is up-to-date, in one embodiment of the present disclosure, a consumer update his/her partial data in the PPAITPN database whenever there is a change of information. For example, when a consumer moves to another state, his/her driver's license and address may change and the consumer updates the partial identification data stored inside the PPAITPN database. The prior information before the change can be stored in a historical record database for future reference.

In one embodiment of the present disclosure, a consumer provides one or more contact phone number and/or email address for contact purposes.

In one embodiment of the present disclosure, a consumer input into the PPAITPN database a list of questions and answers designed by the consumer and associated with some relatively unique fact known only by the consumer. For example, a question may be "What is the name of a person who sat next to me during $1^{st}$ grade?" Because the questions are designed by the consumer, the chance for a fraudster to know the answers is practically negligible. For the purpose of this disclosure, these questions are referred to as "challenge questions."

In another embodiment of the present disclosure, the challenge question is "What is the key code?", and a consumer is required to input a key code into the device interface of a PPAITPN computer system. For the purpose of this disclosure, a key code is an alpha-numeric combination designed by the consumer, substantially like a password. The chance for another person to know or guess the key code is extremely low if the key code is long enough.

To further strengthen the protection of the consumer, in yet another embodiment of the present disclosure, the PPAITPN uses each key code only once or during a predefined period of time. The consumer may update the key code periodically. Alternatively, the consumer can store multiple key codes at one time to avoid the burden of frequently updating the key codes.

To provide additional protection to the consumer, in one embodiment of the present disclosure, a consumer can select his/her own user ID, Personal Identification Number, account number, password, etc. In another embodiment of the present disclosure, a consumer can change his/her user ID, Personal Identification Number, account number, password, etc. from time to time as an extra protection against theft of these data used on the PPAITPN.

After the consumer has registered with a computer system of the PPAITPN, if a fraudster tries to use the consumer's stolen identity to open a financial account at a bank, in one embodiment of the present disclosure, a bank employee can enter into the computer system of the PPAITPN a subset of partial personal information used by the PPAITPN. The computer system of the PPAITPN searches its database to retrieve the photo of the consumer for display by the bank employee.

Alternatively, in another embodiment of the present disclosure, the bank employee can scan an official identification document of the presumed consumer instead of manually entering the subset of partial information into the computer system of the PPAITPN. The computer system of the PPAITPN can search its database to retrieve the photo of the consumer for display by the bank employee. The bank employee can deny the application for a new account or prevent any transaction if the presumed consumer does not match the photo of the consumer.

If the bank employee cannot distinguish the fraudster based on the photo of the consumer, in another embodiment of the present disclosure, the bank employee poses the challenge question or requests the key code designed by the consumer. If the person cannot answer the challenge questions or provide the key code correctly, this person is possibly a fraudster.

In another embodiment of the present disclosure, the bank employee can request the person to provide an additional piece of partial personal information. The computer system of the PPAITPN compares the additional piece of partial personal information with the consumer's information stored in the PPAITPN database to determine whether the person is the consumer.

In yet another embodiment of the present disclosure, a bank employee can call the consumer's phone number, which was provided by the consumer and stored in the PPAITPN database, to verify whether the person in the bank is truly the consumer. In an alternative embodiment of the present disclosure, an employee of the bank can send an email to the consumer to verify whether the consumer is the person in the bank.

In one embodiment of the present disclosure, the bank employee can inform the PPAITPN computer system if the bank employee rejects the transaction and the PPAITPN computer system can send an alert message to the consumer so that the consumer is alerted of a possible identity theft and/or fraud against the consumer. As an alternative embodiment of the present disclosure, the bank employee can confirm that the bank employee has accepted the transaction so that such confirmation can be used by the PPAITPN computer system to further validate the accuracy of the information provided by the consumer.

It is possible that a consumer has not yet opened an account with the PPAITPN computer system when the bank employee enters into the computer system of the PPAITPN a subset of the consumer's partial personal information used by the PPAITPN. Under such circumstances, no photo or challenge question of the consumer is available from the database of the PPAITPN computer system. Accordingly, in one embodiment of the present disclosure, the bank employee can ask a presumed consumer to provide the phone number of his/her personal communication device such as mobile phone, PDA, smartphone, etc. The PPAITPN computer system can verify the identification information provided by the presumed consumer with the customer background information available from the phone company which collects such information during the phone account opening process. A commercial arrangement can be made between the PPAITPN and the phone company to share such information for fraud prevention purposes. If the information provided by the presumed consumer does not correspond to the information available from the phone company, the presumed consumer may have stolen other person's identity.

To make sure that the fraudster does not provide an incorrect phone number, the PPAITPN computer system will send a message or call the presumed consumer based on the phone number received from the presumed consumer. If the presumed consumer can receive the message or phone call, this presumed consumer most likely owns the personal communication device. To ensure that the presumed consumer has truly received the message or phone call, in one embodiment of the present disclosure, the PPAITPN computer system can send a pass code or message to the presumed consumer and ask the presumed consumer to provide the received code or message back to the PPAITPN computer system. If the PPAITPN computer system can receive the correct code or message from the presumed consumer, the presumed consumer's identity is confirmed. Furthermore, in another embodiment of the present disclosure, the PPAITPN computer system will store the identification information and the phone number provided by the presumed consumer into a database. If a fraudster steals the identification information of other persons to conduct fraudulent transactions, it is only a matter of time before the PPAITPN computer system detects two persons with different identification information, but linked to the same personal phone number because the fraudster may use the same personal phone number in these two cases.

In one embodiment of the present disclosure, the PPAITPN computer system informs the bank employee of possible identity theft when the presumed consumer provides his/her personal phone number to the bank employee and such personal phone number is associated with a different person in the database of the PPAITPN computer system. In addition, the PPAITPN can conduct a special investigation on this case.

Similarly, if a fraudster attempts to use the consumer's identity to purchase goods or services at a merchant after stealing the consumer's credit card, in other embodiments of the present disclosure, the photo of the consumer, the challenge questions, the key codes, and/or the additional partial information can be used to detect the fraudster.

In another embodiment of the present disclosure, the merchant informs the PPAITPN computer system if the merchant rejects the transaction and the PPAITPN computer system can send a message to the consumer so that the consumer will be alerted that there is a possible identity theft against the consumer.

As an alternative embodiment of the present disclosure, the merchant can confirm that the merchant has accepted the transaction so that such confirmation can be used by the PPAITPN computer system to further validate the accuracy of the information provided by the consumer.

If a fraudster attempts to use the consumer's identity to purchase goods or services online, in another embodiment of the present disclosure, the challenge questions, the key codes and/or the additional partial personal information can be used by the online merchants to detect the fraudster.

In yet another embodiment of the present disclosure, if the PPAITPN computer system rejects the transaction because the answer is wrong, the PPAITPN computer system can also send a message to the consumer so that the consumer is alerted of a possible identity theft against the consumer.

As an alternative embodiment of the present disclosure, an online merchant can confirm that the online merchant has accepted the transaction so that such confirmation can be used by the PPAITPN computer system to further validate the accuracy of the information provided by the consumer.

In one embodiment of the present disclosure, the PPAITPN can alert the consumer's financial institutions after identifying a possible identity theft and/or fraud against the consumer so that the financial institutions can act to protect the consumer and the financial institutions.

In another embodiment of the present disclosure, a computer system can use the alert provided by the PPAITPN computer system to implement additional provisions to protect the consumer, the financial institutions and possibly other clients of the financial institutions. An additional software system can operate in the financial institutions for anti-fraud purposes based on the alert provided by the PPAITPN computer system. As a result, the PPAITPN enables consumers, financial institutions and merchants to jointly detect identity theft and prevent financial crimes once the consumers, financial institutions and merchants have registered with PPAITPN.

To ensure that a fraudster cannot use a stolen identity to cheat the PPAITPN, the computer system of the PPAITPN can record the historical activities of each consumer in a database and provide an indicator to show how reliable the information associated with the consumer is. In general, the longer a consumer has maintained an account with the PPAITPN, the less chance the consumer is a fraudster. The more inquires submitted by merchants and/or financial institutions to check a consumer with no possible identity theft having been identified, the less chance the consumer is a fraudster. The patterns of the confirmations and failed confirmations received from merchants and/or financial institutions can provide a good indicator of how reliable the data provided by the consumer is.

For example, if a consumer has a long history with the PPAITPN, but only few inquiries from merchants and/or financial institutions have ever occurred related to the consumer, the existence of the consumer may be questionable. It is possible that a fraudster has stolen the identity of a consumer and used it to open an account with PPAITPN. If an unusually large number of inquires about a consumer have been received within a very short period of time right after the consumer opens the PPAITPN account, it is questionable why this consumer behaves very differently from others. If the consumer has appeared at two different merchant locations which are far away from each other and it is impossible for the consumer to travel so fast between these two locations, the consumer and/or one of the merchants may be suspicious. If a merchant or financial institution fails to confirm or disagree with the identification information of the consumer provided by the PPAITPN computer, the consumer's identification information which was provided by the consumer and stored in the PPAITPN database may be questionable. If the confirmations about a consumer are always received from only a few particular merchants, it also may be questionable whether these few merchants are accomplices of the consumer who intends to commit identity theft. If a merchant has confirmed a person's identity while that person turned out to be a fraudster later, the reply from the merchant may be questionable in the future. If a merchant is questionable, its opinions may be questionable. In addition to the above examples, there are many other ways to detect whether there is any suspicious or unusual activity, pattern or characteristic associated with a consumer or a merchant.

Therefore, based on the confirmations, the failed confirmations and the activities, patterns and characteristics of merchants which are involved, the PPAITPN computer can identify suspicious activities, patterns and characteristics associated with a consumer. Since an honest consumer generally does not behave suspiciously, the PPAITPN can determine how reliable the information provided by the consumer is based on the consumer's activities, patterns and characteristics which are indirectly provided by the users (i.e., merchants and financial institutions) of the PPAITPN. As a result, even if the credibility of the sources of data (e.g., the consumers) cannot be verified and the credibility of third parties (e.g., merchants and financial institutions) which validate the accuracy of the data cannot be verified, the PPAITPN computer can still measure the reliability of the data provided by these sources based on statistical analyses of the validation results provided by the third parties and the statistical analyses of these third parties. The users of the PPAITPN information can be alerted if the reliability of the information is questionable or unknown.

It is preferable that a nationwide campaign is used to inform all consumers to register with the PPAITPN as early as possible so that no fraudster will have a chance to use a stolen identity on the PPAITPN.

In one embodiment of the present disclosure, users of the PPAITPN can report a complaint about a particular consumer and such complaint is posted on the PPAITIN. The consumer will be notified by the PPAITPN computer system and will be able to post his/her own version of story in response to the complaint. These open expressions of both parties' opinions are fair to both parties and will provide an alternative reference about the consumer.

Traditionally, it is difficult for a merchant to know the contact information of a consumer in a transaction because the financial institution which processes the transaction is prohibited by law from releasing such information to the merchant. This lack of contact information presents a problem to the merchant when conducting a marketing campaign because the merchant does not have the information needed to contact the consumer. Although some merchants offer incentives for consumers to provide such information at the point of sale, many consumers do not like to do so because it is troublesome.

Since the PPAITPN can be used by merchants to verify the identities of consumers, a link can be established and stored in the database of the PPAITPN computer system between a merchant and a consumer whenever an identity verification process is conducted on the consumer by the merchant. Because a merchant may only verify a consumer's identity when the consumer conducts a transaction with the merchant, the PPAITPN computer system can automatically record and store into a database all the consumers whose identities have been verified by a merchant.

In one embodiment of the present disclosure, the PPAITPN computer system enables a merchant to send marketing, promotional information or coupons through email, mail, fax, phone, message, etc. to consumers whose identities have been previously verified by the merchant through the computer system of PPAITPN. The marketing, promotional information or coupons can be sent to the consumers based on the contact information stored in the database of the PPAITPN computer system. If a particular consumer does not want to receive such marketing, promotional information or coupons, the consumer can request the PPAITPN computer system to block such information or coupons.

In another embodiment of the present disclosure, a merchant can enter product codes of the products purchased by a consumer into the device interface of the PPAITPN computer system when the merchant conducts identity verification of the consumer during a transaction. As a result, the PPAITPN computer system can identify which consumers have purchased a particular product from the merchant.

In one embodiment of the present disclosure, a merchant can precisely reach the target market by requesting the PPAINTPN computer to send marketing, promotional information, coupons, etc. only to consumers who are associated with a particular product code.

Moreover, a merchant can measure the effectiveness of a marketing campaign by recording the marketing campaign identification information, such as campaign number, coupon number, etc. into the computer system of the PPAITPN when conducting identity verification processes. The computer system of PPAITPN can provide statistics regarding the effectiveness of the marketing campaign. For example, the PPAITPN computer system may report that 325 transactions have been conducted after sending the marketing, promotional information or coupons to 748 consumers.

Therefore, the PPAITPN has effectively become a marketing campaign tool for merchants. In this disclosure, there is no need for merchants to collect contact information of consumers. The information is automatically collected by the PPAITPN during its standard operations of preventing identity theft and financial crimes. Although the PPAITPN also may not have the complete identification information of consumers, the PPAITPN can still effectively deliver the marketing material to the target group of consumers. Furthermore, merchants can achieve two objects at the same time when they use the services provided by the PPAITPN, which are (1) fraud prevention and (2) marketing information collection.

To further automate the process of financial crimes prevention, in one embodiment of the present disclosure, the transaction networks of financial institutions, such as the credit card, debit card, stored-value card, gift card, ATM network, etc., can be linked to the PPAITPN computer system so that a consumer's photo, challenge questions, key codes, and/or additional information can be used by merchants when they conduct transactions through these transaction networks.

Because each user of the PPAITPN registers with the computer system of PPAITPN and uses the PPAITPN services based on a unique user ID and password, the PPAITPN can conduct payment transactions for the user. There are many ways to transfer funds electronically between a payer's (e.g., consumer's) account in a financial institution and the payer's account in the PPAITPN. For example, in one embodiment of the present disclosure, an Automatic Clearing House ("ACH") completes such an electronic fund transfer.

In other embodiments of the present disclosure, debit card networks, credit card networks, stored-value card networks, gift card networks, pre-paid card networks, ATM networks, etc. transfer funds electronically between a payer's account in a financial institution and the payer's account in the PPAITPN.

As a result, any consumer, merchant and financial institution can transfer funds to another consumer, merchant and financial institution through the PPAITPN. The PPAITPN can become a common platform for consumers and businesses to conduct commercial activities.

To facilitate anti-financial crimes payment transactions for a consumer, in one embodiment of the present disclosure, a consumer (e.g., the payer) can give the merchant (i.e., the payee) the payer's PPAITPN account number or any identification information such as phone number, name, email address, ID number, etc. The payee can then enter the account identification information into a device interface provided by the PPAITPN computer system over the network. Alternatively, the payer can enter the account identification information into the device interface.

In addition, the payee can enter a dollar amount the payer is supposed to pay. If there are sufficient funds in the payer's PPAITPN account to cover the payment amount, the PPAITPN computer system can freeze the amount of payment in the payer's account and preferably issue a randomly generated "pass code" (i.e., message) which is different in each transaction and which value cannot be known in advance. The pass code can have a numerical value or an alpha-numerical value and can only be used for a specific transaction with a specific merchant.

In one embodiment of the present disclosure, the pass code, the dollar amount, and/or the payee's name are sent to the payer by a text message, email, fax or voice mail through a wireless phone, Personal Digital Assistant (PDA), or other communications device.

After receiving the pass code and confirming the dollar amount and the payee's name, in one embodiment of the present disclosure, the payer may give the pass code to the payee who can enter the pass code into the device interface of the PPAITPN computer system. If the pass code entered by the payee matches the pass code sent to the payer, the PPAITPN computer system can transfer the frozen amount of payment in the payer's account into the payee's account and the payment transaction is completed. Alternatively, the payer can enter the pass code into payee's device interface at point of sale or in an online transaction.

In another embodiment of the present disclosure, after receiving the pass code, a payer can send a message, e.g., a text message, instant message, email, fax, and/or voice mail, to the computer system of the PPAITN to approve a particular transaction based on the particular pass code associated with the transaction.

In one embodiment of the present disclosure, the PPAITPN computer system changes the payer's account number at the request of the payer.

In another embodiment of the present disclosure, the pass code expires after a fixed amount of time. If the correct pass code is not entered into the device interface of the PPAITPN computer system within that fixed amount of time, the pass code expires, the transaction is canceled and the frozen payment amount in the payer's account is released back to the payer.

To further protect the payer, in one embodiment of the present disclosure, if a pre-defined number of incorrect pass codes have been entered against a payer's account, the payer's account is frozen because somebody may be trying to commit fraud against the payer through trial-and-error. The frozen account can be reset (i.e., unfrozen) to normal by the payer or the system administrator of the PPAITPN. The payer can also request the PPAITPN computer system to change the payer's account number before resetting the account status to normal.

Since a fraudster of identity theft usually conducts a shopping spree quickly before the identity theft is discovered, in one embodiment of the present disclosure, if the dollar amount of a single transaction has exceeded a threshold set by the payer, the payer's account can be frozen until the payer or system administrator resets the account to normal. In another embodiment of the present disclosure, if the aggregate amount of transactions of a payer's account during a pre-defined period of time has exceeded a threshold set by the payer, the payer's account is frozen. This frozen account can be reset to normal by the payer or the system administrator. In yet another embodiment of the present disclosure, if the total number of transactions in a payer's account during a pre-defined period of time has exceeded the threshold set by the payer, the payer's account can be frozen.

The payer can log into the PPAITPN computer system to reset the payer's account. Alternatively, the payee or payer can enter an authorization code which is only known to the payer to reset the account.

To prevent payment fraud, a debit card company may issue a new Personal Identification Number (PIN) upon the cardholder's request. Potentially, a cardholder can request a new PIN for each transaction to prevent fraud. However, this approach may cause unnecessary burden to a consumer because the consumer has to proactively make such a request before each transaction.

Furthermore, such approach becomes difficult to use in some environments such as restaurants. Traditionally, a consumer will not leave the dining table in the restaurant and the waiter will receive both the PIN and the debit card from the consumer. If the waiter is dishonest, the consumer can easily become a victim of identity theft because the PIN and debit card number can be given to a fraudster to conduct any kind of fraudulent purchase.

In comparison, the present disclosure fully protects the consumer against such fraud. Because the pass code is randomly generated by the computer system of the PPAITPN in each transaction, the payee cannot steal money from the payer because the payee does not know what the pass code is in each transaction until the payer has provided the pass code to the payee. Because the pass code is generated for a particular payee and the payer will confirm the dollar amount before giving the pass code to the payee, the pass code cannot be used for any other transaction. As a result, for the restaurant example given above, the waiter cannot commit fraud against the consumer. Because the pass code is sent only to the payer, a third party is prevented from stealing money from the payer because the third party will not be able to receive the pass code in order to complete the transaction. Consequently, even if the payee or a third party has stolen the PPAITPN account number of the payer, the payee or the third party cannot commit fraud against the payer.

Because the amount of payment is verified and frozen in the payer's account first before the pass code is generated and sent to the payer, the payer cannot default on the payment.

The need to absorb loss as a result of fraud has been a major operating cost for a payment system. A payment system without good fraud prevention will naturally have high operating costs and may not survive in business competition. The present disclosure is advantageous for mobile payment transactions, e.g., sending payments through mobile phones from payers to a payees, because it can also eliminate fraud in such payment transactions. Traditionally, mobile payment systems depend on cryptography for fraud prevention. For example, technologies have been developed to encrypt the payment request and acknowledgement data and transmit the data through the human voice band channel (i.e., 300 Hertz to 3,300 Hertz) by using acoustic modems. Since expensive cryptographic technology and acoustic modems have to be incorporated into this kind of payment system, such a mobile payment system has not become popular.

In comparison, the present disclosure does not depend on expensive cryptographic technology and special modems. Although a pass code of the present disclosure is not encrypted, no third party can benefit from the pass code because the pass code can only be used once for a specific transaction with a specific merchant. In addition, the pass code will expire after a period of time. If the payer does not approve the transaction, the pass code will automatically expire.

Moreover, in one embodiment a pass code is only generated after the transaction amount is frozen in the payer's account, fully protecting the payee. As additional protection for the payer, in one embodiment of the present invention, the PPAITPN computer system has to receive both a pass code and a personal identification number of the payer before transferring the frozen amount from the payer to the payee. As a result, it is useless to steal the personal communications device of the payer.

Therefore, the fraud prevention mechanism is automatically embedded into the operational process of the PPAITPN system without the need to use any special cryptographic device or technology. The existing infrastructure of voice and data networks will be sufficient to support the present disclosure. This low cost nature of the present disclosure helps make the present disclosure more popular.

Consequently, the anti-fraud payment system of the PPAITPN is useful for all kind of transactions, including point-of-sale transactions when payers and payees meet face-to-face, online transactions and remote transactions when the payee cannot verify who the payer is.

To be more precise technically, the pass code needs not be "randomly generated." The intention behind "random" is to make sure that nobody can figure out what the correct pass code will be for a particular transaction until the payer has received it. Therefore, any method of pass code generation that can fulfill this intention of "unpredictability" can be used with the present disclosure.

The length and complexity of the pass code is a trade-off decision. For example, the probability for a fraudster to correctly guess a numerical pass code which has six digits in length is one out of one million (i.e., $10\times10\times10\times10\times10\times10$). If we use an alpha-numeric pass code with six characters in length, the probability will be reduced to the approximate magnitude of one of one billion (i.e., $36\times36\times36\times36\times36\times36$). In general, the longer the pass code is, the more secured it will be.

In an alternative embodiment of the present disclosure, the pass code is also presented in a bar code format on the screen of the personal communication device so that a device interface can directly read the bar code and there is no need for verbal communications between the payer and payee. In fact, the pass code can be directly sent from payer's wireless phone, smartphone, PDA, etc. to the payee's device interface through optical, acoustic, electronic, magnetic, electro-magnetic media or other media to smooth the payment process for a point-of-sale transaction.

In one embodiment of the present disclosure, when a payer places an order on the Internet, the payer can enter the payer's PPAITPN account number or account identification information into the device interface of the Internet merchant. This PPAITPN account number or account identification information is re-sent by the Internet merchant to the PPAITPN computer system which can send a randomly-generated pass code to the payer. Then, the payer can enter the pass code into the device interface of the Internet merchant. This pass code is re-sent by the Internet merchant to the PPAITPN computer system to transfer the payment amount from the payer's PPAITPN account to the payee's PPAITPN account.

In an alternative embodiment of the present disclosure, after receiving the pass code, a payer can send a message to the computer system of PPAITPN to approve the transaction. As a result, the payer can securely complete the online transaction without releasing any personal information, reducing the possibility of fraud, and protecting the payee.

In another embodiment of the present disclosure, a payer can order goods or services remotely, e.g., through a phone call, by giving the payee the payer's PPAITPN account number or account identification information. In addition, the payer provides the payee with the randomly generated pass code which the payer has received from the PPAITPN computer system. As a result of the present disclosure, the payee can complete the transaction without the need to know the payer's identity and is fully protected in the transaction.

In another embodiment of the present disclosure, a payer can complete the payment transaction by himself at an automatic checkout stand. The payer can enter his PPAITPN account number or account identification information into the checkout stand, which can re-send the payer's PPAITPN account number or account identification information to the PPAITPN computer system. The PPAITPN computer system can send the pass code to the payer. Then, the payer can enter into the checkout stand the pass code which can also be re-sent to the PPAITPN computer system to transfer the payment amount from the payer's account to the payee's account.

In an alternative embodiment of the present disclosure, after receiving the pass code, the payer can send a message to the PPAITPN computer system to approve a particular transaction based on the particular pass code associated with that transaction. Both payer and payee are fully protected against fraud in this transaction and the payer's identity is also fully protected.

In one embodiment of the present disclosure, a consumer's account number or user ID at the PPAITPN computer system can be the phone number of a personal communication device of the consumer. Since each phone number is unique in each country, a phone number of a personal communication device of a consumer can uniquely identify the consumer. If consumers of multiple countries are users of the PPAITPN computer system, the country code can be added to maintain the uniqueness of the account number or user ID.

In another embodiment of the present disclosure, a consumer's email address is used as the user ID or account number. Since each email address is unique, consumer's email address can be used as user ID or account number at the PPAITPN computer system.

In yet another embodiment of the present disclosure, an account number or user ID is assigned by the PPAITPN computer system.

The system of the present disclosure can potentially replace all the traditional payment instruments and, at the same time, provide improved protection for consumers, merchants and financial institutions. Furthermore, there is no need for consumers to carry any traditional financial instruments such as cash, check, credit card, debit card, prepaid card, stored-value card, gift card, ATM card, etc. Moreover, the present disclosure can quickly and securely transfer money to any place with access to the PPAITPN.

In addition, the above anti-fraud system can be used to protect traditional credit card, debit card, stored value card, gift card, prepaid card, stored-value card, check transactions, etc. against fraud when the financial account numbers and networks are coupled to the PPAITPN computer system. For example, in one embodiment of the present disclosure, a pass code can be randomly generated by the PPAITPN computer system after a credit card number, a debit card number, a pre-paid card number, etc. and the dollar amount are entered by the payee. The pass code, the dollar amount and the payee's name are sent to the payer, for example, in a text message, email, or a voice mail. The transaction is not completed until the payee has successfully entered into a device interface the correct pass code which the payer can give to the payee or until the payer has entered the correct pass code at the device interface.

In an alternative embodiment of the present invention, after receiving the pass code, the payer can send a message to the PPAITPN computer system to approve a particular transaction based on the particular pass code associated with that transaction.

If the credit card, debit card, prepaid card, etc. is fabricated or stolen by a fraudster, the fraudster would not receive the pass code, unless the fraudster also has stolen the customer's mobile phone, PDA, smartphone, or email account. A Personal Identification Number can be used to further strengthen the security so that a fraudster cannot complete the transaction even if he has stolen the personal communication device of a consumer because the fraudster may not know what the Personal Identification Number is.

Of course, it is important to remind the payer that he/she should immediately disable this payment function in his/her PPAITPN account, disable the mobile phone, smartphone or PDA, or change the contact information in the PPAITPN computer system database if he/she loses his/her device which is used to receive the message.

The present disclosure can also be used to protect the PPAITPN account user ID, password and/or PIN against theft. Traditionally, a security token device is used to protect login security. Such an approach is generally expensive because hashing, synchronization, digital signature, cryptography and/or other complicated technology are required to produce a token. In addition, the token device itself costs money. Furthermore, a fraudster can still steal the token device from a user.

In one embodiment of the present disclosure, after a user (e.g., a consumer, merchant, or financial institution) has correctly entered the user ID and password and/or PIN when the user tries to login from a source application, a pass code is randomly generated by the system. A pass code can be a simple numerical number or an alpha-numerical number which will expire after a short period of time. Since no hashing, synchronization, digital signature, cryptography or other complicated technology is required to generate a pass code, the PPAITPN computer system can easily produce such a pass code at very low cost.

This pass code is immediately sent to a destination other than the source application from which the user is attempting login. For example, the destination can be an email address, phone number, etc. based on the contact information of the officially registered user stored inside the system. The user has to enter the correct pass code into the system to complete the login process before the pass code expires. As a result, even if a fraudster has stolen the user ID and password and/or PIN, the fraudster cannot log into the system without having the important pass code. Because the pass code is randomly generated and is different in each login, a third party is unable to steal such a pass code.

There is no need to purchase any token device which can become very expensive. The login process of the present disclosure can be quickly implemented as long as the user has some communication device such as a cellular phone which is very popular today.

Therefore, the present disclosure provides an enhanced protection to computer-based systems against identity theft and fraud.

The present disclosure can also prevent ATM fraud. For example, in one embodiment of the present disclosure, the computer system of the ATM network can send a randomly-generated pass code to the owner of the ATM account after a subject has entered the ATM card and PIN number into an ATM terminal. If the subject cannot enter the correct pass code within a pre-defined amount of time or has entered incorrect pass codes more than a pre-defined number of times, the subject is treated as a potential fraudster, and the ATM transaction is aborted.

Under such circumstance, in one embodiment of the present disclosure, the ATM card is held by the ATM terminal without being returned to the subject in order to protect the account holder of the ATM account. In another embodiment of the present disclosure, the ATM account is frozen to protect the true holder of the ATM account.

As an additional convenience to the consumer, in one embodiment of the present disclosure, a consumer can go shopping without carrying any traditional financial instruments such as cash, credit card, debit card, prepaid card, check, monetary instrument, stored-value card, gift card, etc.

For example, the merchant can enter the dollar amount and the consumer's PPAITPN account number into the device interface of the PPAITPN computer system. The consumer can obtain the pass code from his/her cellular phone, smartphone, PDA, etc. and give it to the merchant to complete the transaction. This option is very useful to protect young children whose parents do not feel comfortable letting children carry cash or pre-paid cards for safety reasons.

In fact, a consumer can easily conduct any payment as long as he/she carries some type of communication device, such as a mobile phone, smartphone, PDA, etc. As a result, in the event that a consumer forgets his/her wallet containing financial instruments he/she could still pay the merchant through his/her PPAITPN account. If the consumer forgets to carry the communication device, he/she can still use the merchant's computer to log into the PPAITPN to directly transfer funds from the consumer's PPAITPN account to the merchant's PPAITPN account.

Sometimes, cell phone, smartphone, PDA, etc. have to be turned off at certain locations (e.g., some restaurants). It is also possible that the signals of cell phone, smartphone, PDA, etc. cannot be received correctly at certain locations. To handle such unusual situations, in one embodiment of the present disclosure, the PPAITPN computer system can generate a pass code in advance in response to the request of the consumer.

As a result, the consumer can give his/her account number and the pass code to the payee based on the same procedure as described above. A consumer should only perform such type of transactions if he/she truly trusts that the payee will not use his/her pass code for fraudulent purposes.

To protect the consumer, in one embodiment of the present disclosure, the consumer can enter the PPAITPN account number of the payee in advance so that the pass code provided by the PPAITPN computer system is used to conduct a payment transaction with that particular payee.

In another embodiment of the present disclosure, the consumer can determine how long the pass code will stay effective. As a result, a pass code will automatically expire if it is not used within that pre-defined period of time.

In yet another embodiment of the present disclosure, a consumer can specify a maximum dollar amount permitted for a pass code. As a result, the pass code cannot be used if the dollar amount of the payment has exceeded the maximum amount specified by the consumer.

In one embodiment of the present disclosure, the consumer can specify that one pass code can be used for multiple payment transactions at possibly different stores. For example, this application is necessary for a consumer to do holiday shopping at a mall where signals of communication devices cannot be correctly received. Under such circumstances, in one embodiment of the present disclosure, the consumer specifies a maximum dollar amount for the total amount of transactions permitted for that pass code.

In another embodiment of the present disclosure, the consumer specifies a maximum dollar amount for each of the transactions permitted for that pass code. In an alternative embodiment of the present disclosure, the consumer specifies a maximum number of transactions permitted for the pass code.

There are many ways or many combinations of ways to protect the consumer. A trade-off between security and convenience should be considered.

To help consumers post "fraud alerts" with consumer credit report companies, in one embodiment of the present disclosure, the PPAITPN computer system periodically sends messages to the consumers to remind them to post "fraud alerts." Once a consumer has posted a fraud alert, he/she can inform the PPAITPN computer system through the device interface of the PPAITPN computer system so that the PPAITPN computer system does not send any reminder to the consumer until the time to renew such fraud alerts.

To avoid forgetting to renew a fraud alert, in one embodiment of the present disclosure, the consumer can enter his/her preferred early warning period into the PPAITPN computer system. For example, if the early warning period is seven days, the PPAITPN computer system can begin to send reminders to the consumer beginning seven days before the expiration date until the fraud alert has been renewed.

As an alternative embodiment of the present disclosure, the PPAITPN computer system can link to computer systems of credit report companies to automatically renew the fraud alerts with these credit report companies whenever the fraud alerts have expired. This service can continue for a particular consumer until he/she stops such service.

To protect the private information of consumers, in one embodiment of the present disclosure, consumers appoint the PPAITPN as their agent to renew fraud alerts. In addition, the credit report companies can record and store the consumer's PPAITPN identification information in its database.

After a consumer has posted a fraud alert with the credit report company, the consumer can ask the PPAITPN to renew the fraud alert whenever it expires. In one embodiment of the present disclosure, the PPAITPN computer system informs the computer of the credit report company to renew the fraud alert based on the PPAITPN identification information or account identification information provided by the credit report company.

In another embodiment of the present disclosure, the computer system of the credit report company checks with the PPAITPN computer system whether a renewal is required based on the consumer's PPAITPN identification information or account identification information provided by the credit report company. As a result, there is no need for the PPAITPN computer system to record any private information about the consumer in the PPAITPN database.

If the PPAITPN computer system cannot link directly to a computer system of a credit report company, in an alternative embodiment of the present disclosure, the PPAITPN computer system collects from a consumer all information required by the credit report company to post a fraud alert. In addition, the PPAITPN computer system emulates the consumer's behavior by logging into a device interface of the computer system of the credit report company, providing the information required by the credit report company and submitting the request for posting a fraud alert on behalf of the consumer.

The PPAITPN computer system can repeat this process whenever the fraud alert is about to expire. As a result, there is no need for any human involvement in this process. If the consumer does not want this posting fraud alert service anymore, the consumer can inform the PPAITPN computer system to stop such service.

As contemplated in the described embodiments, some of many possible combinations are described below as examples. The computer system of the Privacy Protected Anti-Identity Theft and Payment Network ("PPAITPN") 500 and a packet switched network, such as the Internet 600 enable a consumer 100, a financial institution 200, a retail store 300 and an online merchant 400 to jointly prevent financial crimes as shown in FIG. 1 when conducting transactions.

Figure 2:
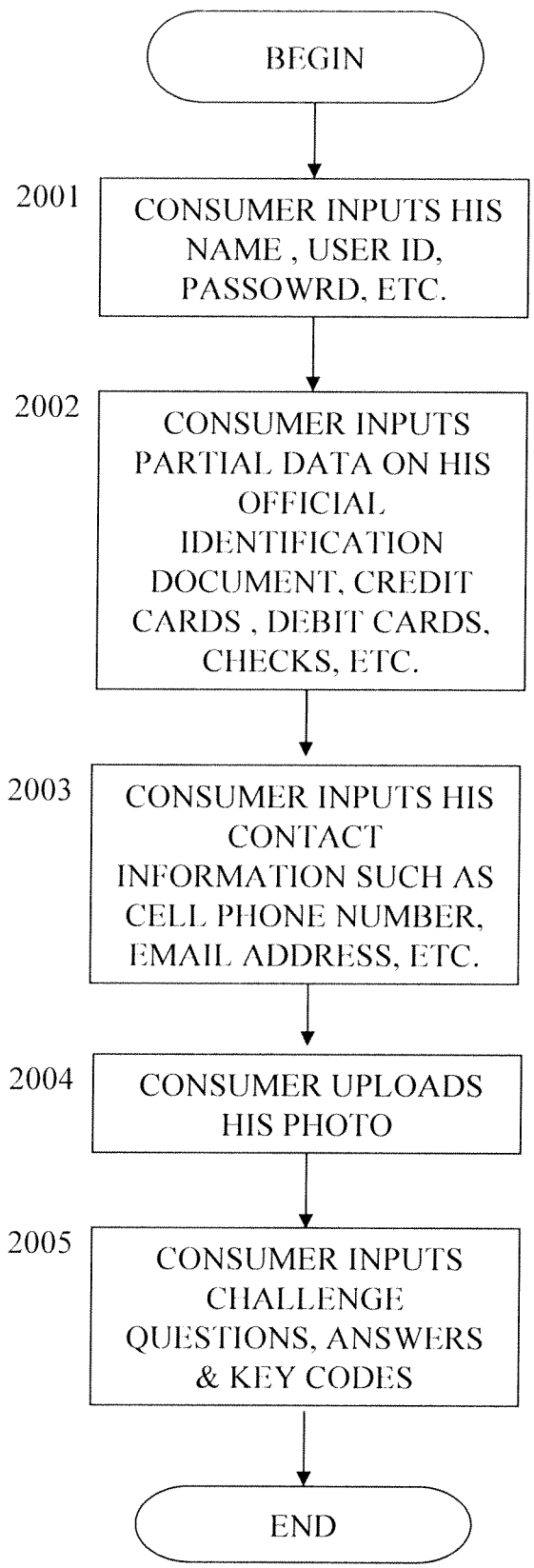
FIG. 2 is a flow chart of an example process, indicating how a consumer registers with the computer system of PPAITPN as shown in FIG. 1.

Reference should now be made to the flowchart of FIG. 2 in combination with the system diagram of FIG. 1, which together illustrate an exemplary process in which a consumer can register with the computer system of the PPAITPN.

First (block 2001), a consumer 100 inputs his name, user ID and, password into the computer system of the PPAITPN 500 through the Internet 600.

Through the Internet 600 (block 2002), the consumer 100 further inputs into the computer system of the PPAITPN 500 some partial data shown on his official identification document (e.g., last four digits of the driver license number or passport number, expiration date of the driver license or passport, the first five digits of the zip code of the address shown on the driver license or passport, etc), credit card, debit card, or prepaid card (e.g., last six digits of the card number, the security code, the expiration date of the card, the type of card, etc.), check (e.g., the last eight digits of the checking account number, etc), and/or other financial instruments.

Then (block 2003), a consumer 100 inputs his contact information such as mobile phone number, email address, etc. into the computer system of the PPAITPN 500 through the Internet 600.

Furthermore (block 2004), the consumer 100 uploads his photo into the computer system of the PPAITPN 500 through the Internet 600.

In addition (block 2005), the consumer 100 inputs into the computer system of the PPAITPN 500 through the Internet 600 a set of challenge questions, the corresponding answers, and/or at least one key code.

Figure 3A:
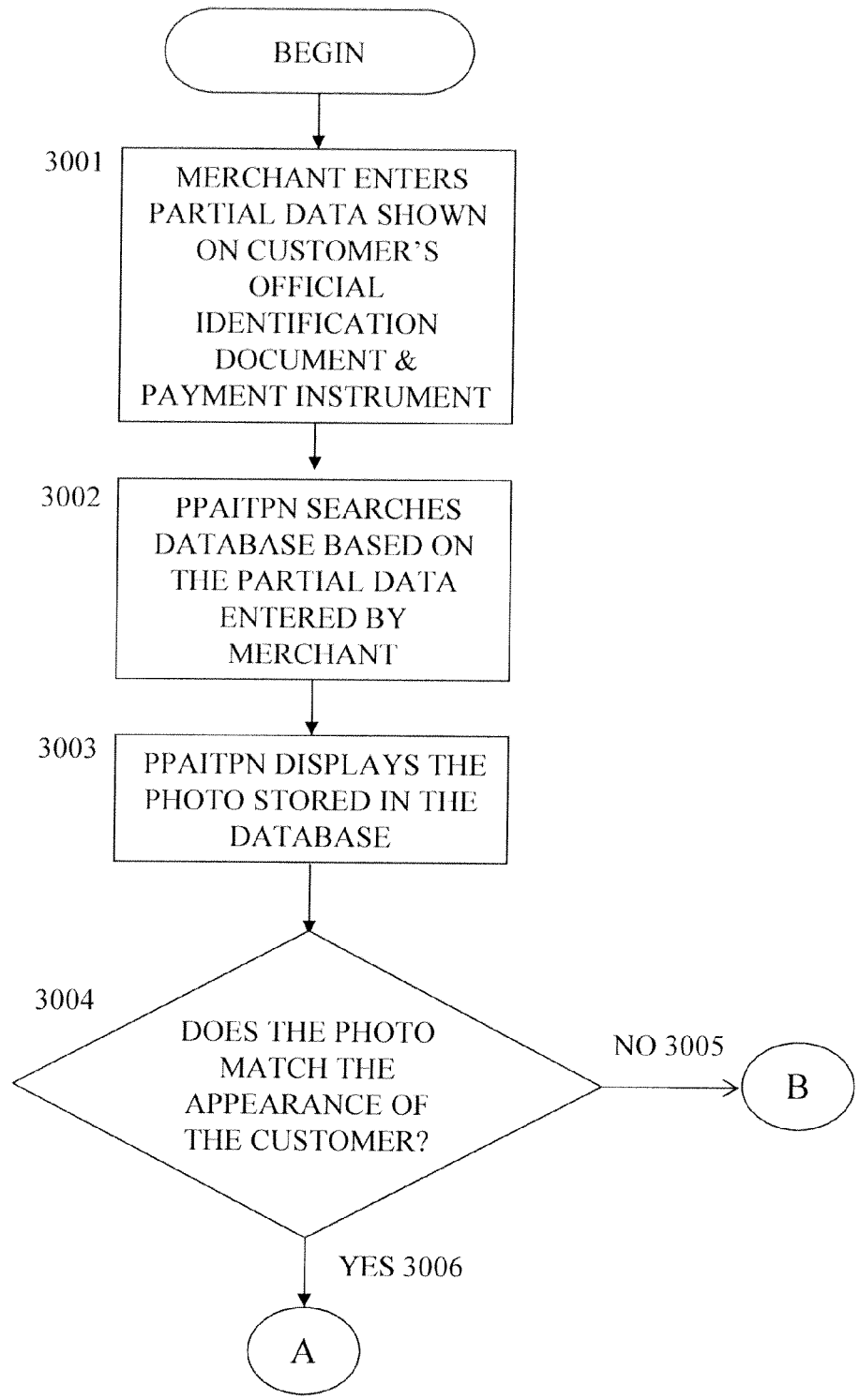
FIG. 3A and FIG. 3B are flow charts of an example process, indicating how the system shown in FIG. 1 protects retail stores against identity theft and fraud.
Figure 3B:
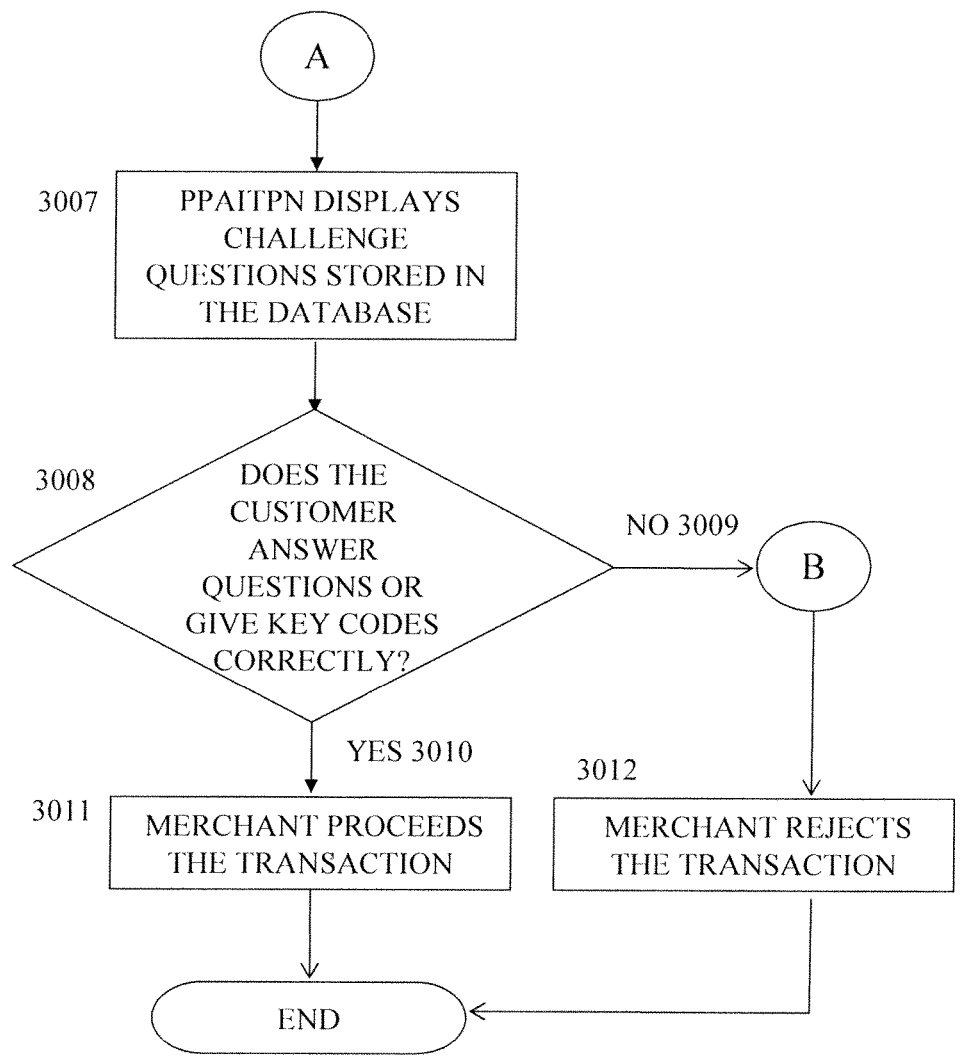

Reference should now be made to the flowcharts of FIGS. 3A and 3B in combination with the system diagram of FIG. 1, which together illustrate an example of how the computer system of the PPAITPN 500 protects the consumer 100 and a merchant (e.g., retail store) 300 through the Internet 600.

When a presumed consumer (e.g., a "customer") conducts a transaction with a retail store 300 based on the identity of the consumer 100, the retail store 300 can ask the consumer to provide an identification document (e.g., driver license, etc.), and a payment instrument such as credit card, debit card, prepaid card, or check.

The retail store 300 enters (block 3001), for example, the last six digits of the credit card number and the last four digits of the driver license number into the computer system of the PPAITPN 500 through the Internet 600. The computer system of the PPAITPN 500 searches its database (block 3002) and display the names of all the possible matches through the Internet 600 based on the information entered by the retail store 300. The retail store 300 selects the correct name based on the name shown on the driver's license of the consumer. Based on the selected name, the photo of the consumer 100 which is stored in the database of the computer system of PPAITPN 500 is displayed through the Internet 600 (block 3003).

The retail store 300 compares the photo of the consumer 100 with the appearance of the presumed consumer (decision block 3004), if the photo does not match the appearance of the consumer (NO branch 3005), the retail store 300 should reject the transaction (block 3012). If the photo of the consumer 100 seems to match the appearance of the presumed consumer (YES branch 3006), the retail store 300 has the option to ask the challenge questions or request key codes (block 3007) displayed through the Internet 600 based on the questions of the consumer 100 stored inside the database of the computer system of PPAITPN 500.

The retail store 300 can take different actions based on whether the presumed consumer can correctly answer the challenge questions or provide the key codes designed by the consumer 100 (decision block 3008). If the presumed consumer cannot answer the challenge questions correctly or cannot provide the key codes (NO branch 3009), the retail store 300 should reject the transaction (block 3012). On the other hand, if the presumed consumer can correctly answer the challenge questions or can correctly provide the key codes (YES branch 3010), the retail store 300 can proceed in the transaction (block 3011).

Reference should be made to the flowchart of FIG. 4 in combination with the system diagram of FIG. 1, which together illustrate an example of how an online merchant 400 can prevent financial crimes through the computer system of PPAITPN 500.

When a presumed consumer conducts a transaction with an online merchant 400 based on the identity of the consumer 100, according to the convention, the online merchant 400 requests the consumer to provide his name and the account number of the payment instrument (e.g., credit card, debit card, prepaid card, check, etc.), the expiration date, and/or the security code. The online merchant 400 may input (block 4001), for example, the last six digits of the credit card number of the consumer, the name of the consumer, the expiration date, and/or the security code into the computer system of the PPAITPN 500 through the Internet 600.

Because it is almost impossible for two people to have the same name, the same last 6 digits on their credit cards, the same expiration date, and the same security code, the computer system of the PPAITPN 500 can search its database and find the record of the consumer 100 (block 4002). In the unlikely event of two people having the same set of partial data as described above, the computer system of the PPAITPN 500 can request additional partial data such as the last four digits of the driver license number, the first five digits of the zip code shown on the driver license, etc.

Once the computer system of the PPAITPN 500 has identified the record of the consumer 100 in its database, (block 4003) the computer system of the PPAITPN 500 can provide the online merchant 400 with the challenge questions of the consumer 100. The online merchant 400 can take different actions based on whether the consumer can correctly answer the challenge questions or provide the key code designed by the consumer 100 (decision block 4004). If the consumer cannot answer the challenge questions correctly or cannot provide the key codes correctly (NO branch 4005), the online merchant 400 should reject the transaction (block 4008). On the other hand, if the consumer can correctly answer the challenge questions or can correctly provide the key codes (YES branch 4006), the online merchant 400 can proceed in the transaction (block 4007).

Figure 5A:
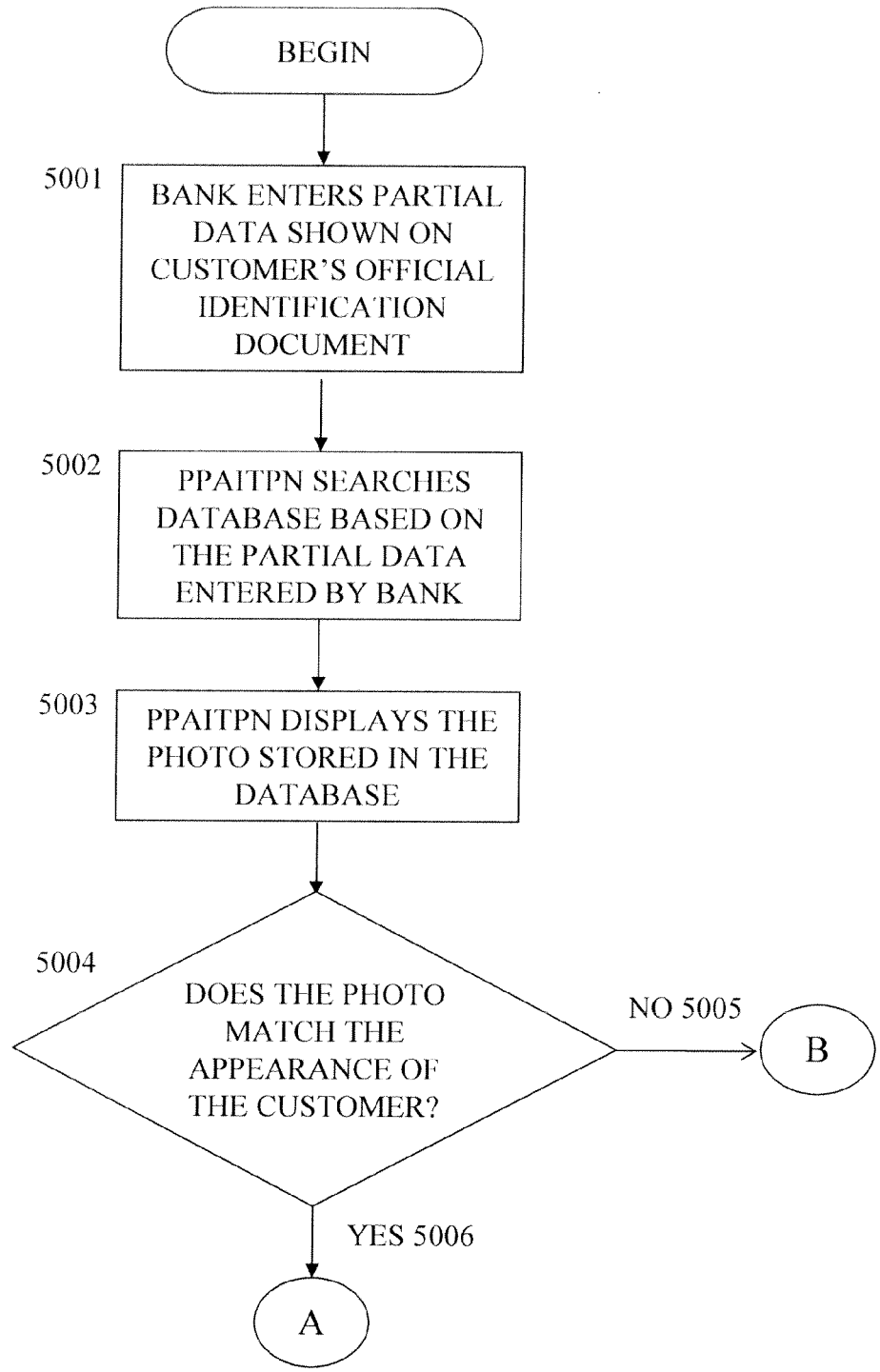
FIG. 5A and FIG. 5B are flow charts of an example process, indicating how the system shown in FIG. 1 protects financial institutions such as banks against identity theft.
Figure 5B:
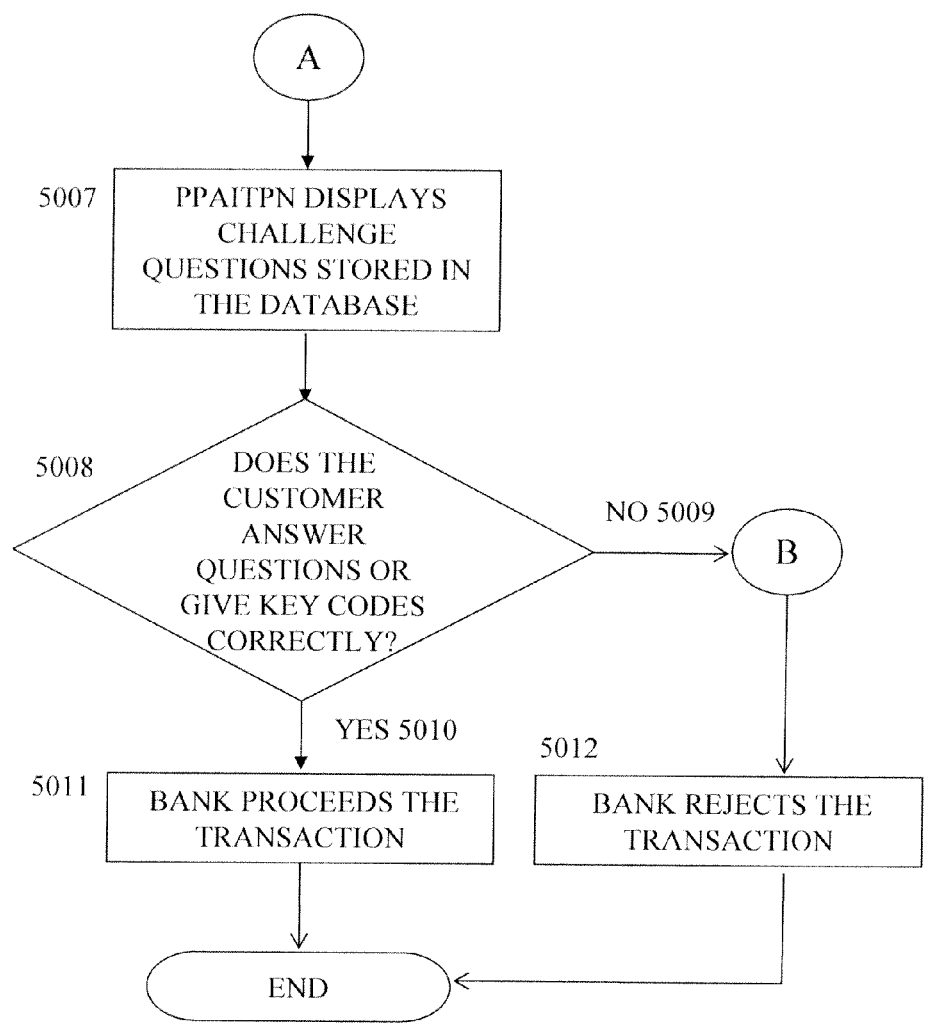

To illustrate an example of how the computer system of the PPAITPN 500 protects the consumer 100 and a financial institution 200 through the Internet 600, reference should now be made to the flowcharts of FIGS. 5A and 5B in combination with the system diagram of FIG. 1.

When a prospective consumer attempts to open an account or conducts a transaction with a financial institution 200 (e.g., a bank) based on the identity of the consumer 100, the financial institution 200 can ask the consumer to provide an identification document (e.g., driver license, passport, etc.). The financial institution 200 enters a set of partial data (block 5001) of the presumed consumer, for example, the last four digits of the driver license number, the expiration date of the driver license, and the first five digits of the zip code shown on the driver license into the computer system of the PPAITPN 500 through the Internet 600.

The computer system of the PPAITPN 500 searches its database (block 5002) and display the names of all the possible matches through the Internet 600 based on the information entered by the financial institution 200.

The financial institution 200 selects the correct name based on the name shown on the driver license of the presumed consumer. Based on the select name, the photo of the consumer 100 which is stored in the database of the computer system of the PPAITPN 500 can be displayed through the Internet 600 (block 5003).

The financial institution 200 compares the photo of the consumer 100 with the appearance of the presumed consumer (decision block 5004), if the photo does not match the appearance of the presumed consumer (NO branch 5005), the financial institution 200 should reject the transaction (block 5012). If the photo of the consumer 100 seems to match the appearance of the consumer (YES branch 5006), the financial institution 200 has the option to ask the challenge questions or request key codes (block 5007) displayed through the Internet 600 based on the questions of the consumer 100 stored inside the database of the computer system of the PPAITPN 500.

The financial institution 200 can take different actions based on whether the presumed consumer can correctly answer the challenge questions or provide the key codes designed by the consumer 100 (decision block 5008). If the presumed consumer cannot answer the challenge questions correctly or cannot provide the key codes (NO branch 5009), the financial institution 200 should reject the transaction (block 5012). On the other hand, if the consumer can correctly answer the challenge questions or can correctly provide the key codes (YES branch 5010), the financial institution 200 can proceed in the transaction (block 5011).

As illustrated by the above examples, consumers, merchants and financial institutions can jointly prevent financial crimes and avoid losses and damages through the computer system of the PPAITPN 500.

Figure 6:
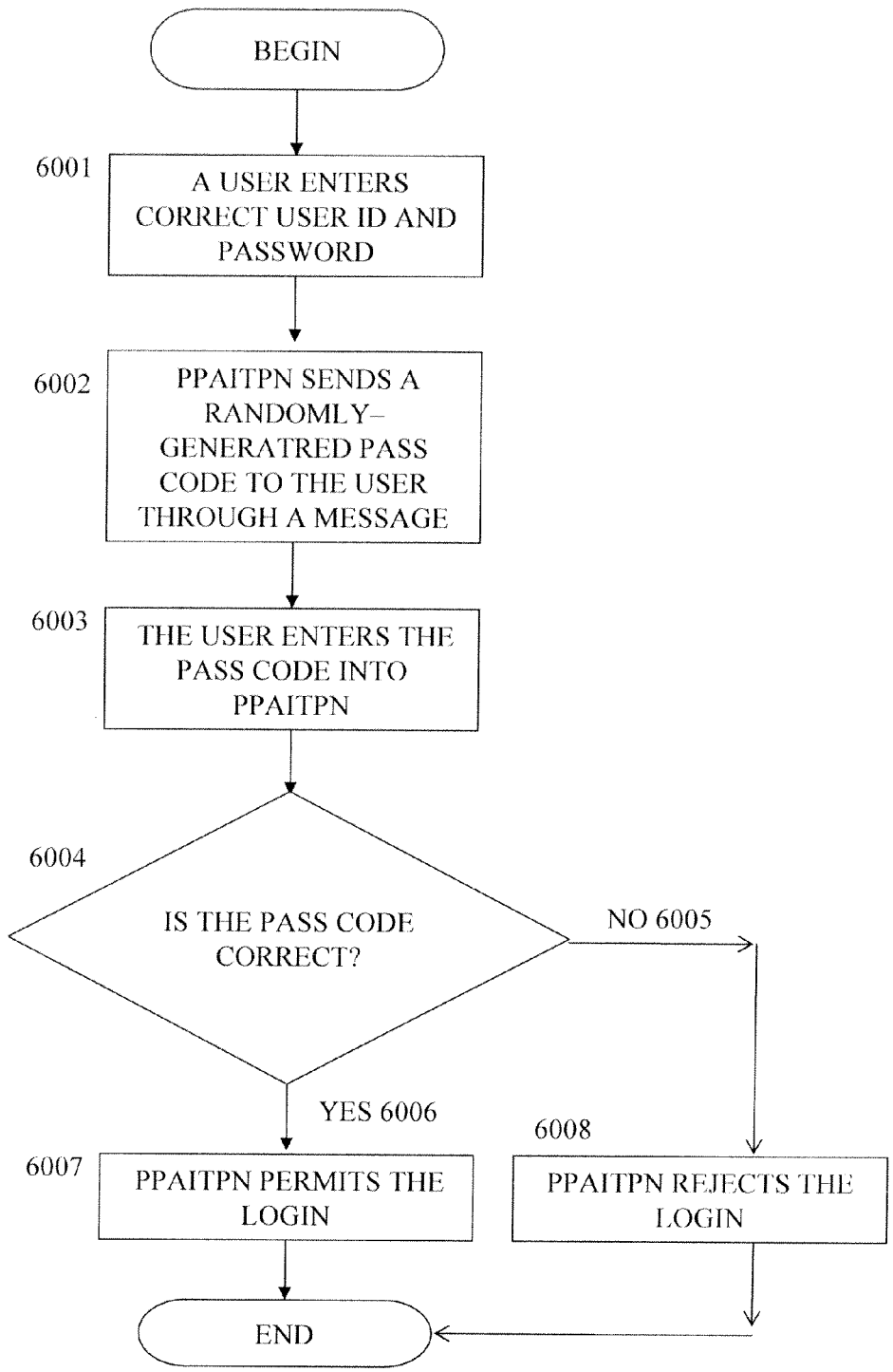
FIG. 6 is a flow chart of an example process, indicating how the system shown in FIG. 1 can ensure that a perpetrator cannot log into the system even if the perpetrator has stolen the correct user ID and/or PIN, and password.

To illustrate an example of how the computer system of the PPAITPN 500 protects a user if his/her user ID and password are stolen, reference should now be made to the flowchart of FIG. 6 in combination with the system network diagram of FIG. 1.

When a presumed user intends to log into the PPAITPN computer system, he/she must enter the correct user ID and password (block 6001) like the traditional approach. If the user ID and password are correct, the PPAITPN computer system can randomly generated a pass code which is different in each login. In addition, the PPAITPN computer system can send this pass code to a destination associated with the officially registered user through a message (block 6002).

The presumed user confirms receipt of the pass code by entering the pass code, which he/she just received in the message, into the PPAITPN computer system (block 6003). The PPAITPN computer system compares the pass code entered by the presumed user with the pass code generated by the PPAITPN computer system and makes a decision (decision block 6004). If the pass code is incorrect (the NO branch 6005), the PPAITPN computer system can reject the login (block 6008). If the pass code is correct (the YES branch 6006), the PPAITPN computer system can permit the user to login (block 6007).

A consumer may have forgotten to bring his/her wallet or have lost his/her wallet while he/she is away from home. Under such circumstances, he/she may still have the need to conduct a payment transaction when a traditional payment instrument and identification document (e.g., driver license, etc.) is not available. In addition, for online transactions or remote transactions, the payee cannot tell for sure whether the payer has the correct identity and authority to complete the transaction. The PPAITPN computer system 500 can resolve the issues as mentioned above.

Figure 7A:
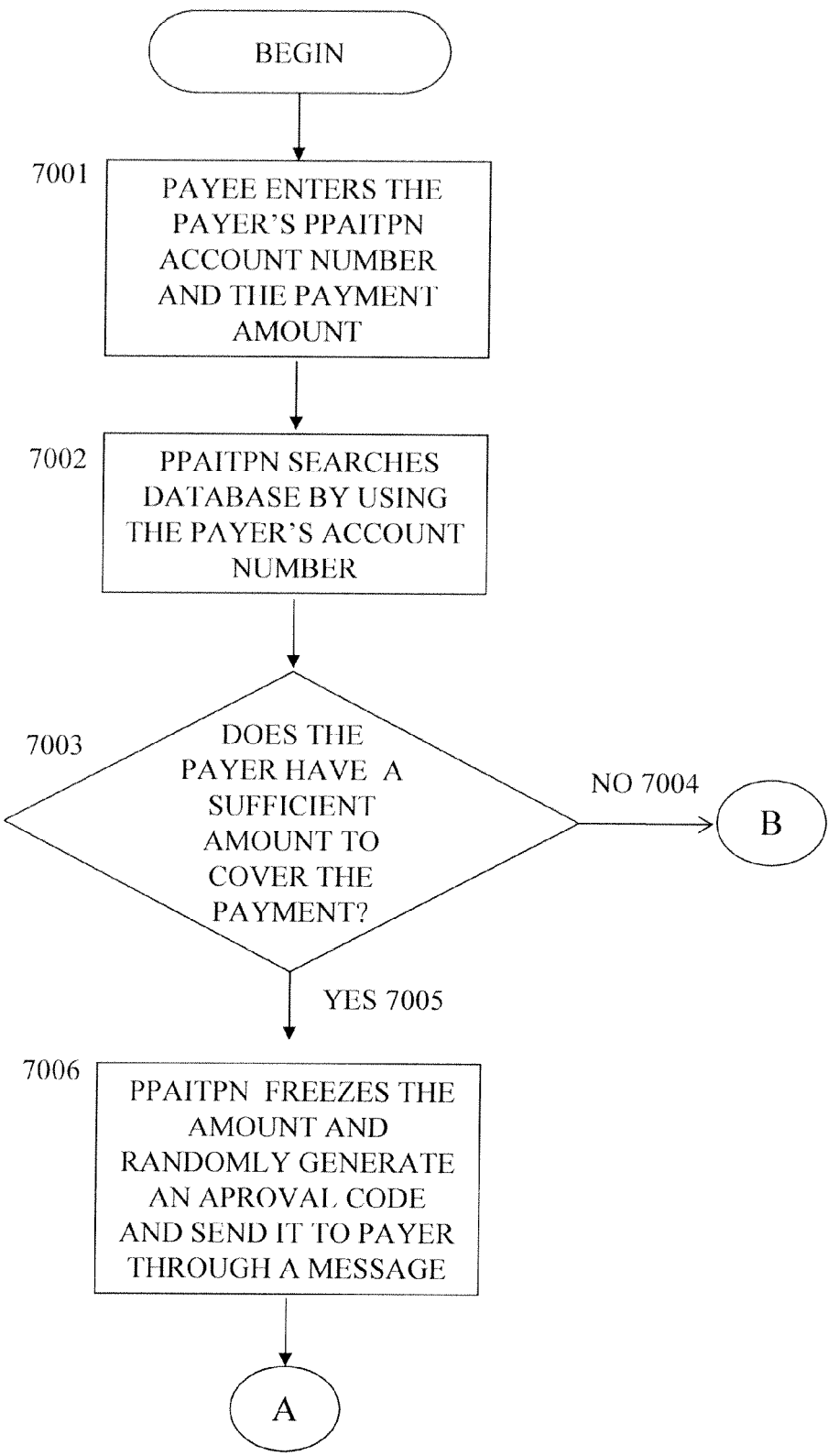
FIG. 7A and FIG. 7B are flow charts of an example process, indicating how the system shown in FIG. 1 empowers a user to conduct an anti-fraud payment without using any traditional payment instrument.
Figure 7B:
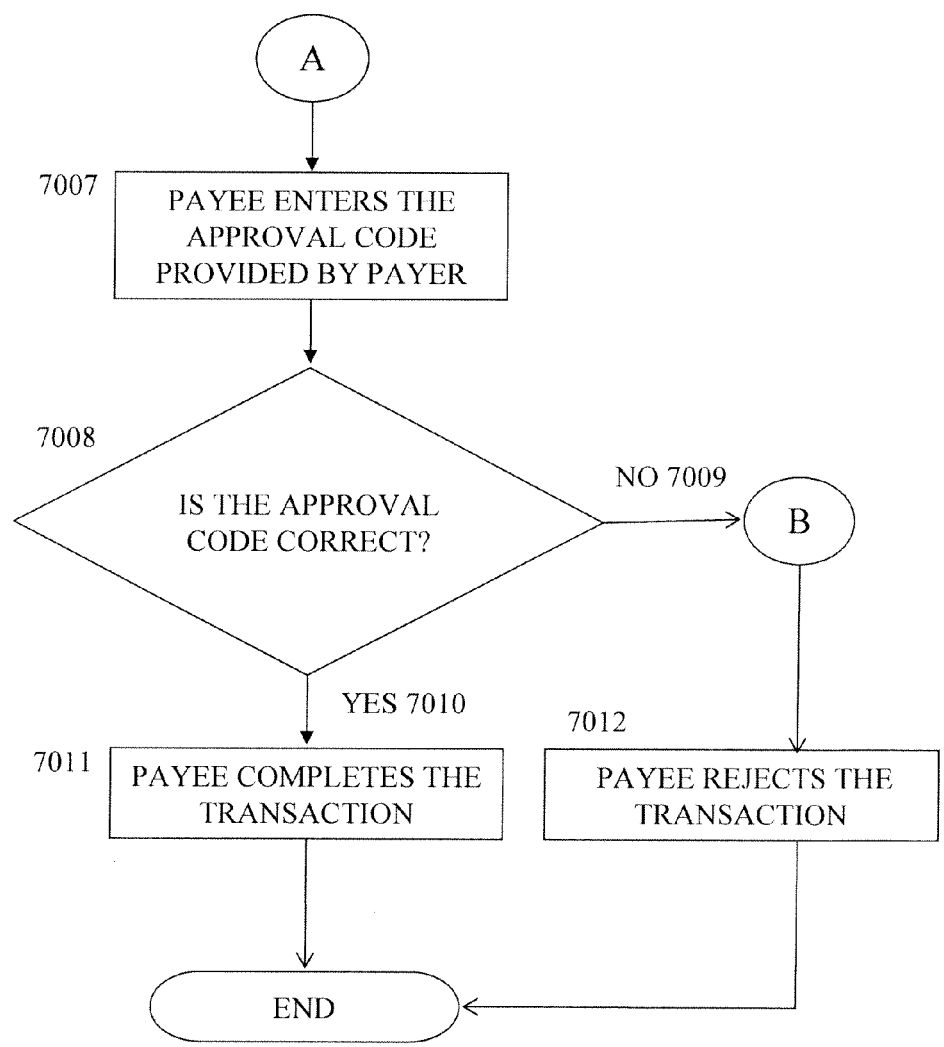

To illustrate an example of how the computer system of the PPAITPN 500 enables the consumer 100 (i.e., the payer) to pay a retail store 300 (i.e., the payee) without releasing any personal information and without using any traditional payment instrument, reference should now be made to the flowchart of FIGS. 7A and 7B in combination with the system diagram of FIG. 1.

The payer 100 gives his/her PPAITPN account number to the payee 300 and the payee 300 enters this account number and the dollar amount of the transaction into the device interface of the PPAITPN computer system 500 (block 7001) through the network 600. The PPAITPN computer system 500 searches its database to locate the account of the payer 100 based on the account number input by the payee 300 (block 7002).

The PPAITPN computer system 500 determines whether sufficient funds are present to cover the payment of the transaction (decision block 7003). If there is not a sufficient amount of money in the payer's PPAITPN account (NO branch 7004), the PPAITPN computer system 500 informs the payee to reject the transaction (block 7012). If there are sufficient funds in the payer's PPAITPN account to cover the payment (YES branch 7005), the PPAITPN computer system 500 can freeze such payment amount in the payer's account, randomly generate a pass code and send the pass code to the payer 100 through a message (block 7006).

The payer 100 confirms receipt of the pass code by giving the pass code to the payee 300 who enters the pass code into the device interface of the PPAITPN computer system 500 through the network 600 (block 7007). The PPAITPN computer system 500 then compares the pass code entered by the payee 300 with the pass code sent to the payer 100 (decision block 7008). If the pass code is incorrect (NO branch 7009), the PPAITPN computer system 500 can inform the payee 300 to reject the transaction (block 7012). If the pass code is correct (YES branch 7010), the PPAITPN computer system 500 can transfer the frozen payment amount from the payer's account to the payee's account and the payee 300 can proceed to complete the transaction (block 7011).

Because the pass code is randomly generated in each transaction and is only sent to the payer 100 for that specific transaction, there is little chance for a third party to know the pass code or to reuse the pass code to commit any payment fraud. Because the dollar amount of the transaction has to be approved by the payer 100 before the payer 100 gives the pass code to the payee 300 for that specific transaction, there is no chance for the payee 300 to commit any payment fraud against the payer 100. Because the payment amount in the payer's PPAITPN account is frozen before the pass code is randomly generated and sent to the payer 100, there is no chance for the payer 100 to commit any payment fraud against the payee 300. Because the payee 300 only needs to know the payer's account number, the payer's identity is fully protected. Because the payer 100 only needs to provide the pass code to the payee 300 to complete the transaction, this transaction can be conducted either face-to-face or remotely.

To further protect the consumer, in one embodiment of the present disclosure, a consumer's PPAITPN account number can be changed upon the request of the consumer. As a result, it does not make any sense for a third party to steal the PPAITPN account number which is just a temporary reference number in the transaction.

In another embodiment of the present disclosure, the consumer defines the maximum dollar amount that can be used in each transaction. If a transaction has exceeded this maximum dollar amount, the PPAITPN account will be frozen until the consumer resets it back to normal. In yet another embodiment of the present disclosure, the consumer defines the maximum number of transactions that can occur in a fixed period of time. If the number of transactions has exceeded this maximum number, the PPAITPN account will be frozen until the consumer resets it to normal.

As a result, a consumer can shop without the need to carry any traditional financial instrument such as credit card, debit card, prepaid card, gift card, check, cash, etc. or identification document, such as a driver's license. Even if the consumer forgets to bring his/her cellular phone, smartphone, or PDA, he/she can still conduct payment by logging into the PPAITPN computer system and transferring funds from his/her PPAITPN account to the merchant's PPAITPN account.

Figure 8:
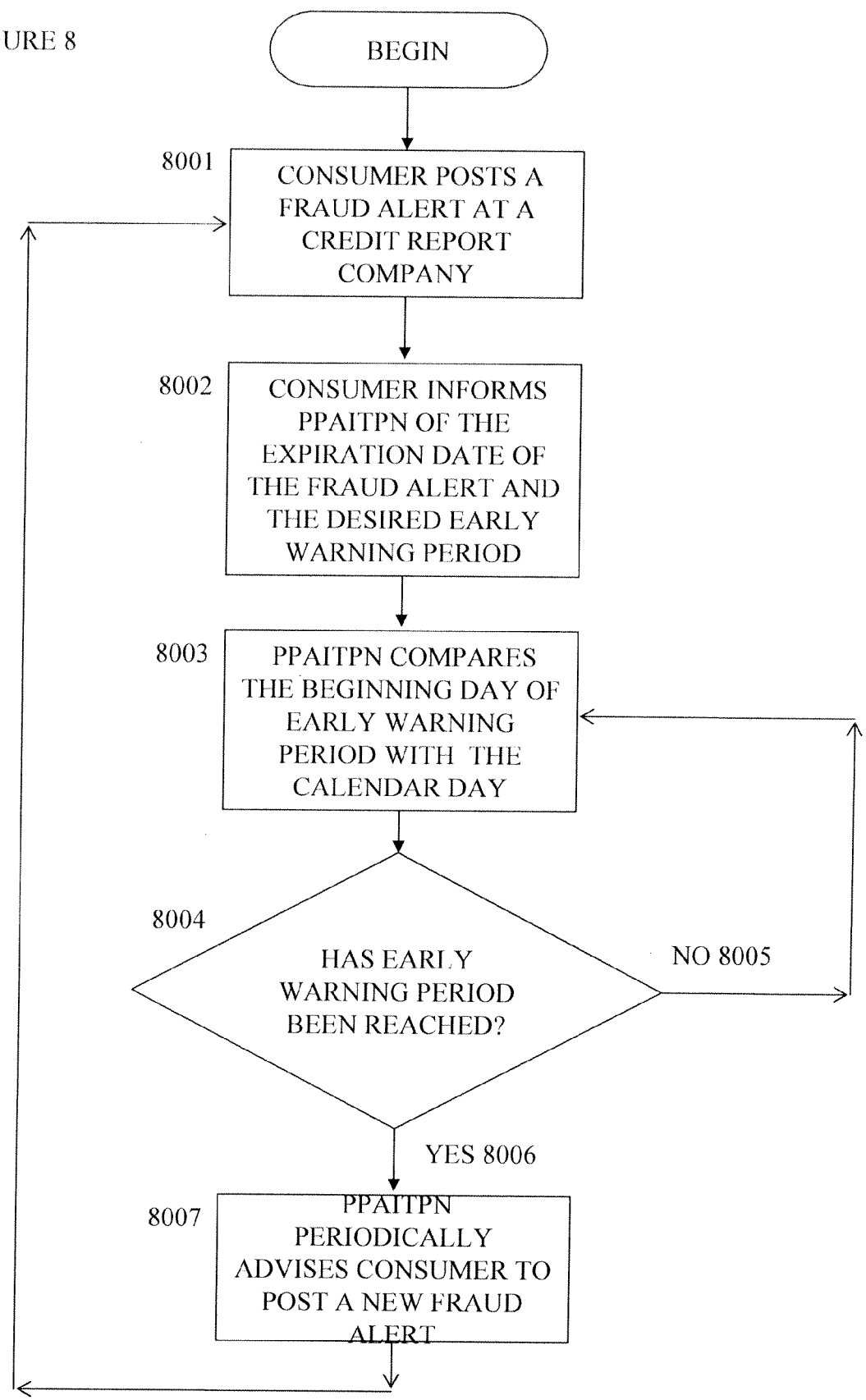
FIG. 8 is a flow chart of an example process for helping a consumer post a fraud alert with a credit report company.

The PPAITPN computer system can also help a consumer prevent fraudsters from opening financial accounts under the consumer's identity by posting fraud alerts with credit report companies. To illustrate an example of how the computer system of the PPAITPN 500 helps the consumer 100 post a fraud alert with a credit report company, reference should now be made to the flowchart of FIG. 8 in combination with the system diagram of FIG. 1.

First, a consumer 100 posts a fraud alert with a credit report company (block 8001). Then, the consumer 100 informs the PPAITPN computer system 500 of the expiration date of such a fraud alert and his/her desired early warning period (block 8002). For the purposes of this disclosure, the early warning period is defined as a period used by the consumer to prepare for the fraud alert posting action before the expiration date of the fraud alert.

The PPAITPN computer system 500 compares the beginning day of the early warning period with the calendar day on a constant basis (block 8003) and determines whether the calendar day has reached the early warning period of the fraud alert (decision block 8004). If it has not reached the desired early warning period (NO branch 8005), the PPAITPN computer system 500 can continue to compare the calendar day with the beginning day of the early warning period (block 8003). If the calendar day has reached the desired early warning period (YES branch 8006), the PPAITPN computer system 500 periodically advises the consumer to post a new fraud alert (block 8007). This periodic notice can stop after the consumer posts a new fraud alert (block 8001) and sets a new expiration day for the fraud alert (block 8002).

In another embodiment of the present disclosure, the PPAITPN computer system can link with the computer system of a credit report company. Under such circumstances, the PPAITPN computer system can periodically post a new fraud alert for a consumer whenever the old fraud alert has expired.

Although some of the preceding descriptions were with respect to transmissions across a single network, e.g., the internet, other types of transmissions are contemplated. For example, a payer could receive a pass code over a first type of network, for example a cellular data network and the payee could the receive authorization via a second type of network, for example a WiFi network. Therefore, the PPAITPN computer system may use a combination of communication devices to achieve the objects of the present disclosure.

The methodologies described herein may be implemented by various means depending upon the application. For example, these methodologies may be implemented in hardware, firmware, software, or any combination thereof. For a hardware implementation, the processing may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor. Memory may be implemented within the processor or external to the processor. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM, DVD, or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. The communication apparatus may not store all of the instructions and/or data on a computer readable medium.

The embodiments described in this disclosure can be assembled to form a variety of applications based on the need. Those skilled in the art and technology to which this disclosure pertains can appreciate that alterations and changes in the described structure may be practiced without meaningfully departing from the principal, spirit and scope of this disclosure. Such alterations and changes should not be construed as deviations from the present disclosure.

What is claimed is:

1. A method for preventing identity theft, comprising:

storing, at a first computer system, a first set of customer-specific information obtained from a data source comprising customer-specific information, the first set of customer-specific information being insufficient to determine an identity of a customer;

receiving, from a second computer system associated with a merchant, a second set of customer-specific information obtained via a device configured to obtain embedded data from the data source;

comparing, by the first computer system, the second set of customer-specific information with the first set of customer-specific information to verify the identity of the customer, by:

transmitting, from the first computer system to a customer's mobile device, a bar code to be displayed on a display of the customer's mobile device, when the first set of customer-specific information matches the second set of customer-specific information, the bar code associated with a first pass code;

receiving, from the second computer system, a second pass code based on the second computer system reading the bar code from the display of the customer's mobile device; and comparing, at the first computer system, the second pass code to the first pass code; and determining whether a transaction should proceed when the identity is verified based on a match between the first pass code and the second pass code.

2. The method of claim 1, in which the data source is at least one of a credit card, a debit card, an ATM card, a gift card, a pre-paid card, a stored-value card, a check, a monetary instrument, a financial account instrument, a brokerage account instrument, an insurance account instrument, a benefits account instrument, a mobile account instrument, or a combination thereof.

3. The method of claim 1, in which the data source is at least one of a driver's license, a passport, a government-issued identification document, an alien identification card, a student identification card, a social security card, a tax identification card, a national identification card, a voter identification card, a benefits card, an official identification document, or a combination thereof.

4. The method of claim 1, in which the first computer system is at least one of a computer system, personal communications device, terminal, device interface, or a combination thereof.

5. The method of claim 1, in which the second computer system is at least one of a computer system, personal communications device, terminal, device interface, or a combination thereof.

* * * * *